US010286460B2

(12) United States Patent
Murphy

(10) Patent No.: US 10,286,460 B2
(45) Date of Patent: May 14, 2019

(54) SINGLE-PASS, SINGLE-RADIAL LAYER, CIRCUMFERENTIAL-PROGRESSION FILL-WELDING SYSTEM, APPARATUS AND METHOD FOR REFURBISHING RAILWAY AND OTHER TRANSIT RAILS

(71) Applicant: Robert J. Murphy, Troy, NY (US)

(72) Inventor: Robert J. Murphy, Troy, NY (US)

(*) Notice: Subject to any disclaimer, the term of this patent is extended or adjusted under 35 U.S.C. 154(b) by 167 days.

(21) Appl. No.: 15/481,635

(22) Filed: Apr. 7, 2017

(65) Prior Publication Data

US 2018/0291563 A1   Oct. 11, 2018

(51) Int. Cl.
*B23C 3/00* (2006.01)
*B23C 5/14* (2006.01)
(Continued)

(52) U.S. Cl.
CPC ............... *B23C 5/14* (2013.01); *B23C 3/005* (2013.01); *B23K 9/044* (2013.01); *B23K 9/1675* (2013.01);
(Continued)

(58) Field of Classification Search
CPC ............... B23K 26/342; B23K 10/027; B23K 11/0013; B23K 9/23; B23K 9/1735; B23K 9/1675; B23K 9/235; B23K 9/044; B23K 2103/04; B23K 2101/26; Y10T 29/49718; Y10T 29/49721; Y10T 29/49723;
(Continued)

(56) References Cited

U.S. PATENT DOCUMENTS 188,780 A    3/1877  Dawes
593,953 A    11/1897 Falk
(Continued)

FOREIGN PATENT DOCUMENTS

DE    2621357 A1    11/1977
WO    9718921 A1    5/1997

OTHER PUBLICATIONS

Jul. 23, 2018 Search Report for counterpart application PCT/US18/25732.
(Continued)

*Primary Examiner* — Sarang Afzali
*Assistant Examiner* — Darrell C Ford
(74) *Attorney, Agent, or Firm* — Jay R. Yablon

(57) ABSTRACT

A method and related system and apparatus for refurbishing worn rail transit rails to a desired refurbished rail surface profile substantially similar to the surface profile of a newly-manufactured rail, comprising: depositing a first line of fill material along a lower-inside section to be refurbished; in N−1 successive iterations thereafter, progressing circumferentially from the lower-inside section to be refurbished to an upper-outside section to be refurbished, depositing an n+1$^{th}$ line of fill material adjacent an n$^{th}$ line of fill material wherein the n$^{th}$ line of fill material substantially provides a flow barrier against the n+1$^{th}$ line of fill material flowing past the n$^{th}$ line of fill material.

26 Claims, 11 Drawing Sheets

(51) Int. Cl.

| | |
|---|---|
| *B23K 9/04* | (2006.01) |
| *B23K 9/23* | (2006.01) |
| *B23P 6/00* | (2006.01) |
| *C21D 9/50* | (2006.01) |
| *B23K 9/167* | (2006.01) |
| *B23K 9/173* | (2006.01) |
| *B23K 9/235* | (2006.01) |
| *E01B 31/13* | (2006.01) |
| *E01B 31/18* | (2006.01) |
| *B23K 101/26* | (2006.01) |
| *B23K 103/04* | (2006.01) |

(52) U.S. Cl.
CPC .............. *B23K 9/1735* (2013.01); *B23K 9/23* (2013.01); *B23K 9/235* (2013.01); *C21D 9/50* (2013.01); *E01B 31/13* (2013.01); *E01B 31/18* (2013.01); *B23C 2215/32* (2013.01); *B23C 2220/28* (2013.01); *B23K 2101/26* (2018.08); *B23K 2103/04* (2018.08); *B23P 6/00* (2013.01); *Y10T 29/4975* (2015.01); *Y10T 29/49718* (2015.01); *Y10T 29/49721* (2015.01); *Y10T 29/49723* (2015.01); *Y10T 29/49725* (2015.01); *Y10T 29/49726* (2015.01); *Y10T 29/49746* (2015.01); *Y10T 29/49748* (2015.01)

(58) Field of Classification Search
CPC ......... Y10T 29/49725; Y10T 29/49726; Y10T 29/49746; Y10T 29/49748; Y10T 29/4975; B23C 5/14; B23C 2215/32; B23C 2220/28; B23C 3/005; E01B 31/18; E01B 31/13; C21D 9/50; B23P 6/00
USPC .................. 29/402.01–402.21; 228/119, 170
See application file for complete search history.

(56) References Cited

U.S. PATENT DOCUMENTS

| | | | | |
|---|---|---|---|---|
| 950,033 | A | | 2/1910 | Sturdevant |
| 1,395,805 | A | | 11/1921 | Feibelmann |
| 1,607,118 | A | | 11/1926 | Delachaux |
| 1,924,838 | A | | 8/1933 | Daley |
| 1,933,139 | A | | 10/1933 | Daley |
| 2,075,842 | A | | 4/1937 | George |
| 2,186,966 | A | | 1/1940 | George |
| 2,186,967 | A | * | 1/1940 | George ............... E01B 31/18 219/76.11 |
| 2,305,711 | A | | 12/1942 | Jones et al. |
| 2,688,180 | A | * | 9/1954 | Morton ............... B23K 5/18 228/27 |
| 2,787,967 | A | | 4/1957 | Nohejl |
| 2,787,968 | A | | 4/1957 | Luvisi |
| 2,819,681 | A | | 1/1958 | Luvisi |
| 2,824,526 | A | | 2/1958 | Nohejl |
| 3,120,818 | A | | 2/1964 | Lyons |
| 3,124,492 | A | | 3/1964 | Dewez et al. |
| 3,133,343 | A | | 5/1964 | Kratkay |
| 3,366,075 | A | | 1/1968 | Claybome et al. |
| 3,623,207 | A | | 11/1971 | Zoso et al. |
| 4,841,116 | A | * | 6/1989 | Kimura ............... B23K 9/038 219/73.1 |
| RE32,979 | E | | 7/1989 | Panetti |
| 4,875,657 | A | * | 10/1989 | Moller ............... B22D 19/10 249/86 |
| 4,959,523 | A | * | 9/1990 | Fihey ............... B23P 23/04 219/124.34 |
| 5,134,808 | A | * | 8/1992 | Panetti ............... E01B 31/17 451/28 |
| 5,140,776 | A | * | 8/1992 | Isdahl ............... B24B 19/004 451/429 |
| 5,195,436 | A | | 3/1993 | Valditerra |
| 5,222,435 | A | | 6/1993 | Theurer et al. |
| 5,270,514 | A | | 12/1993 | Wechselberger et al. |
| 5,566,437 | A | | 10/1996 | Jaeggi |
| 5,611,234 | A | | 3/1997 | Allegrucci et al. |
| 5,992,329 | A | | 11/1999 | Scheuchzer et al. |
| 6,033,291 | A | * | 3/2000 | Mathison ............... E01B 31/17 15/54 |
| 6,168,676 | B1 | | 1/2001 | Seguin |
| 6,207,920 | B1 | * | 3/2001 | Morlock ............... B23K 9/0026 219/54 |
| 6,227,282 | B1 | | 5/2001 | Kuster et al. |
| 6,262,573 | B1 | | 7/2001 | Wojnarowski et al. |
| 6,297,466 | B1 | | 10/2001 | Hussary et al. |
| 6,396,020 | B1 | * | 5/2002 | Thelen ............... B23K 9/0026 219/54 |
| 6,719,616 | B2 | | 4/2004 | Mathison et al. |
| 6,762,390 | B2 | | 7/2004 | Theurer et al. |
| 7,156,723 | B2 | * | 1/2007 | Natarajan ............... E01B 31/17 451/347 |
| 7,253,380 | B2 | | 8/2007 | Miller |
| 7,416,622 | B2 | | 8/2008 | Kuppers et al. |
| 7,520,415 | B2 | | 4/2009 | Kral et al. |
| 8,367,960 | B2 | * | 2/2013 | Keefe ............... B23K 9/046 219/54 |
| 8,388,775 | B2 | | 3/2013 | Poloni et al. |
| 8,490,548 | B2 | | 7/2013 | Sauron |
| 8,735,761 | B2 | | 5/2014 | Theurer et al. |
| 9,126,287 | B2 | * | 9/2015 | Bruck ............... B23K 9/042 |
| 2002/0125216 | A1 | * | 9/2002 | Sauron ............... B23K 9/038 219/54 |
| 2004/0231763 | A1 | | 11/2004 | Kuppers et al. |
| 2005/0067381 | A1 | * | 3/2005 | Coomer ............... B23K 9/0026 219/54 |
| 2005/0241147 | A1 | * | 11/2005 | Arnold ............... B23P 6/007 29/889.1 |
| 2007/0007251 | A1 | | 1/2007 | Kral et al. |
| 2007/0217670 | A1 | | 9/2007 | Bar-Am |
| 2010/0111628 | A1 | * | 5/2010 | Megens ............... B23F 5/20 409/26 |
| 2011/0168050 | A1 | | 7/2011 | Sauron |
| 2011/0297752 | A1 | * | 12/2011 | Keefe ............... B23K 9/046 238/122 |
| 2013/0133784 | A1 | * | 5/2013 | Kristan ............... C21D 9/04 148/526 |
| 2013/0153543 | A1 | * | 6/2013 | Tsubota ............... B23K 26/0823 219/74 |

OTHER PUBLICATIONS

Jul. 23, 2018 Written Opinion / ISA for counterpart application PCT/US18/25732.
List of countries by rail transport network size, https://en.wikipedia.org/wiki/List_of_countries_by_rail_transport_network_size, printed Apr. 7, 2017.
Milling (machining)—Wikipedia, https://en.wikipedia.org/wiki/Milling_(machining), printed Apr. 7, 2017.
Milling cutter—Wikipedia, https://en.wikipedia.org/wiki/Milling_cutter, printed Apr. 7, 2017.
K-TIG | The Fastest Way to Weld, http://www.k-tig.com/, printed Apr. 7, 2017.

* cited by examiner

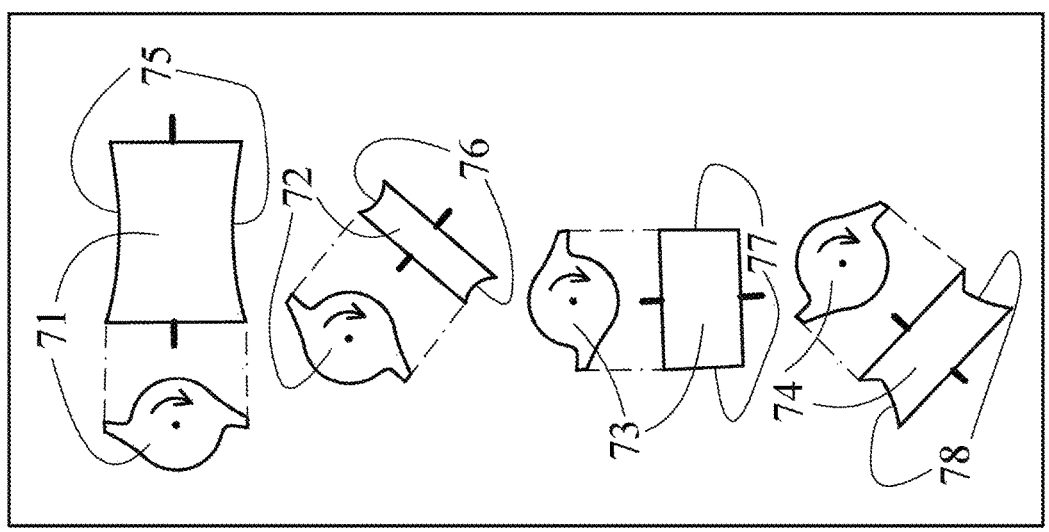
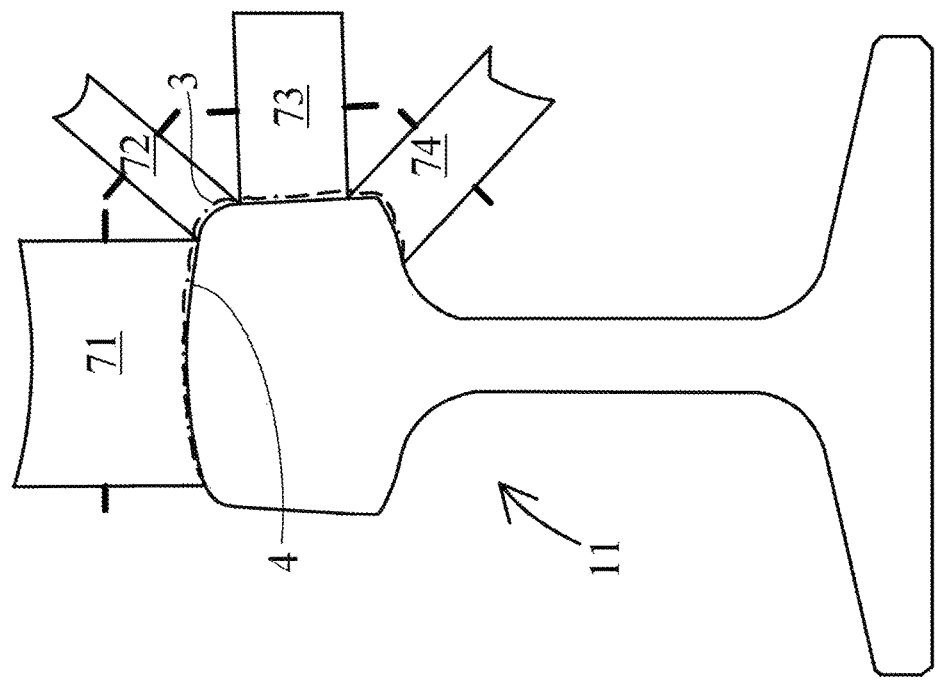
Figure 7
Figure 8

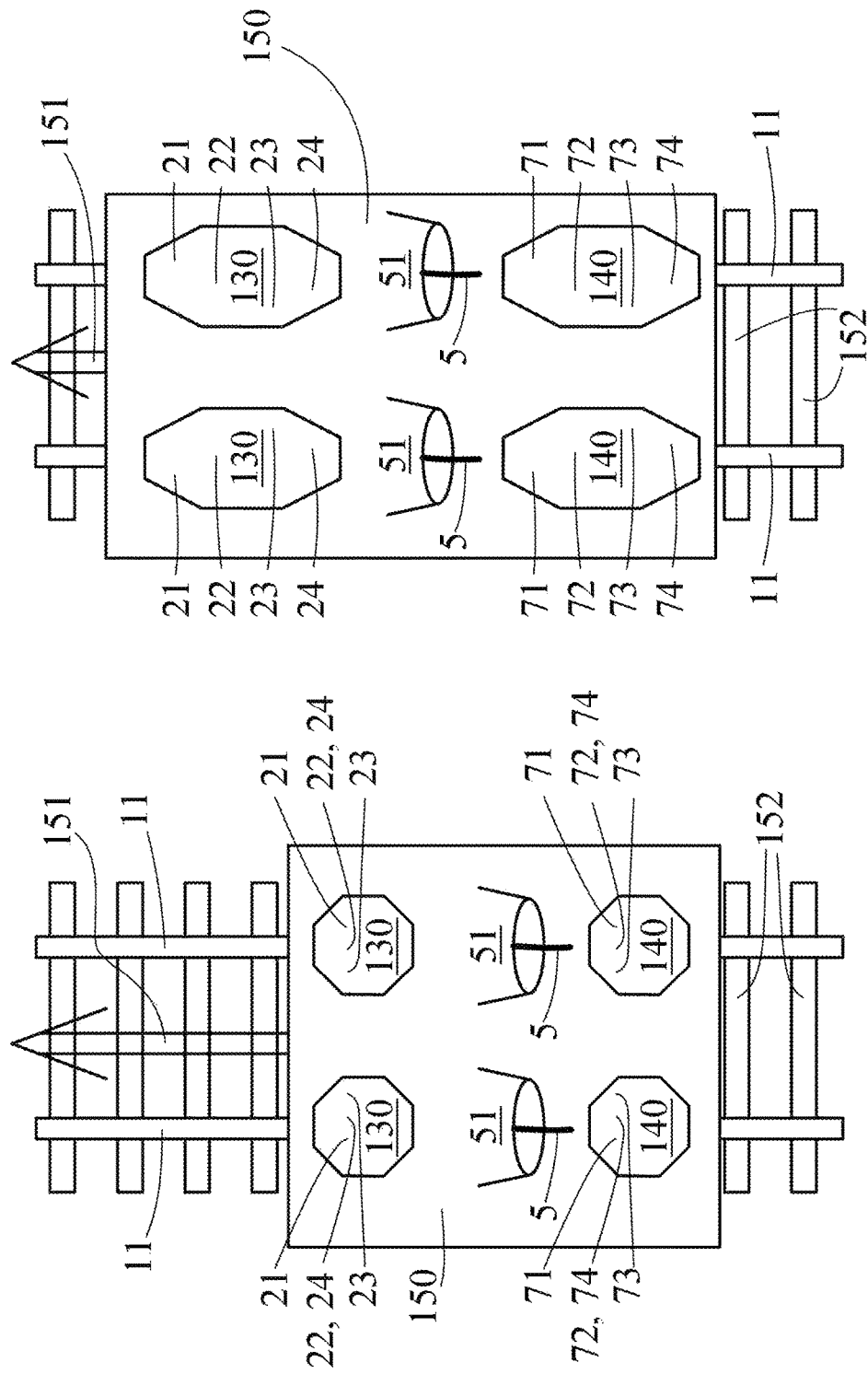

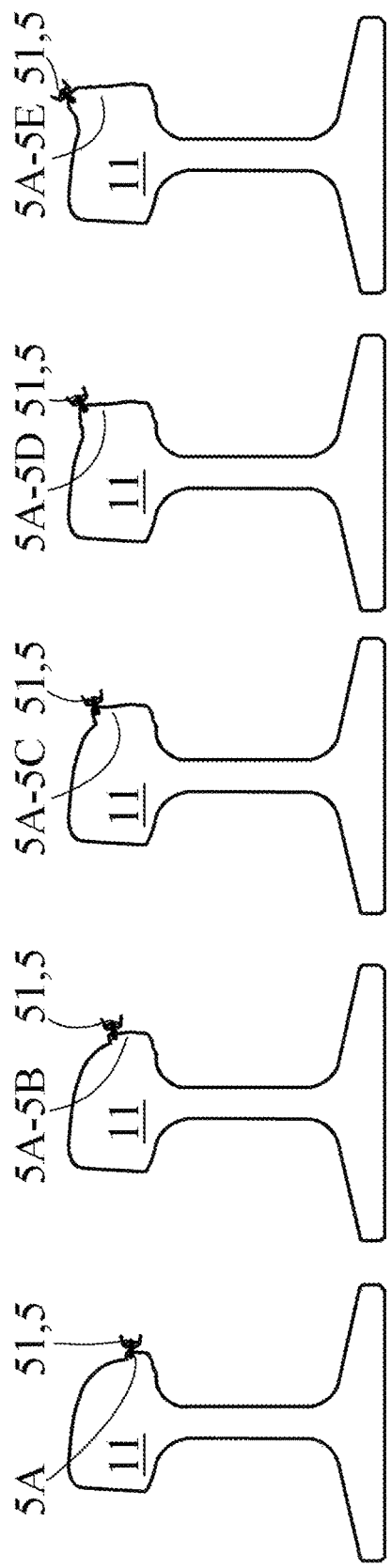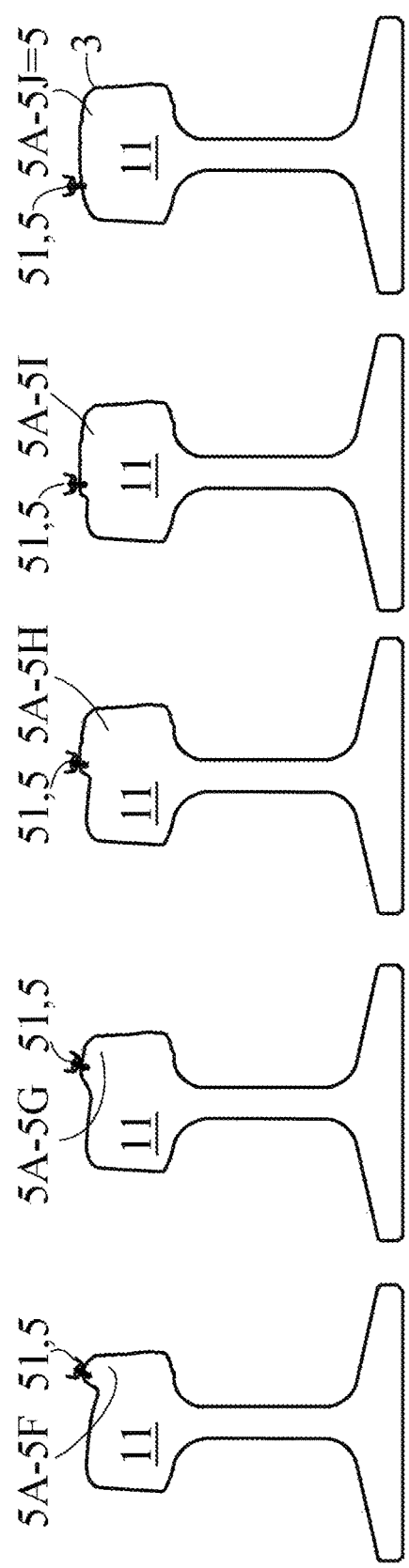

SINGLE-PASS, SINGLE-RADIAL LAYER, CIRCUMFERENTIAL-PROGRESSION FILL-WELDING SYSTEM, APPARATUS AND METHOD FOR REFURBISHING RAILWAY AND OTHER TRANSIT RAILS

BACKGROUND OF THE INVENTION

Railroads are an important part of the national and international infrastructure for travel by people and the transportation of goods. As of 2012 there were approximately 140,000 miles of standard gauge rail in operation in the United States alone, and about 850,000 miles of rail worldwide (https://en.wikipedia.org/wiki/List_of_countries_by_rail_transport_network_size).

As with any infrastructure asset, rails deteriorate over time, and need to be repaired or replaced. This is an expensive and time consuming process. An information disclosure filed with this application reveals the processes and associated apparatuses often used at present or in the past, which in many cases involve the complete replacement of rail sections, and in some cases rail repair/refurbishment. In all cases, the process is costly, time-consuming, and disruptive to commercial rail traffic. Often, sections of rail routes need to be shut down during the repair or replacement and even removed, which slows or disrupts service over those sections and thus is a substantial source of additional economic loss. And, if rails are not removed, the refurbishment needs to be carefully scheduled between the scheduled runs of trains over those rail routes.

U.S. Pat. No. 8,367,960 is one of the few patents in the aforementioned information disclosure which does not require rail removal (although rail removal is presented as an option at element 124), and which fixes more than just the butt welds between rail sections. Rather, U.S. Pat. No. 8,367,960 utilizes a process of cleaning 130, preheating 140, welding 150, post-heating 160, shaping 170 and testing 180, see FIG. 2, and may be applied with the rail left in place.

Although this is preferable to the other prior art approaches, the multiple radial layers of metal illustrated by 20A through 20G in FIG. 4 and also apparent in FIG. 5 are problematic. First, basic mechanical engineering principles rooted in empirical experience teach that having multiple joints between each of the adjacent layers illustrated by 20A through 20G will make these layers more prone to cracking and chipping than if there was simply a single, substantial seamless layer in the radial direction (i.e., the geometric direction of the radial lines 1, 2, 3 in FIG. 5 outward from the center of the railhead). Specifically, each inter-layer joint along the radial direction illustrated in FIG. 4 becomes a fault surface along which chipping and cracking can occur under the weight and vibration of travel by multiple trains in succession.

Second, as evidenced by FIGS. 6A and 6B of U.S. Pat. No. 8,367,960, this radial layering ends up causing substantial hardness variations as a function of depth below the restored rail surface, which variations are "below the AREMA hardness requirement" from about 8 mm to 15 mm in depth, see column 6 lines 45 to 68. To remediate this requires the additional step of post-heating 160 as thereafter described in connection with FIGS. 7 and 8 of U.S. Pat. No. 8,367,960. In effect, the post-heating functions to "temper the existence of martensite" and "to temper the prior weld beads of the multiple welding process. As a result, the surface hardness of the welded metal surface may be about 410 HB to about 450 HB, thereby not only meeting the AREMA hardness requirements but also exceeding the original rail surface hardness by, e.g., approximately 50%. Thus, an anticipated wear life of the restored rail section or a new rail section may be substantially increased," see column 7 lines 14-26 of U.S. Pat. No. 8,367,960.

Third, the overall refurbishment process is made slower because of the need to apply multiple radial layers, and additionally to post-heat 160 these layers to temper them and overcome the problem of below-standard hardness and susceptibility to cracking and chipping along weld lines, all stemming from the radial layering.

Finally, having the outside rail surface "exceeding the original rail surface hardness by, e.g., approximately 50%" is actually not a desirable outcome. Either the hardness should be substantially-uniform along the radial lines of the rail, or the hardness should decrease as one moves radially-outward toward the railhead surface, which provides some plasticity to the surface contacted by the trail wheels. If the surface harness is substantially greater than the interior hardness as is taught by U.S. Pat. No. 8,367,960, then a sort of "eggshell" configuration is created wherein the outside surface of the rail can "crush" the inside rail under heavy stresses.

It would desirable to be able to only apply a single fill layer in the radial direction, and by doing so, to entirely avoid the above-mentioned radial layering problems. It is also desirable to avoid the need for any form of post-heating, i.e., to entirely omit the need for a post-heating step such as that disclosed by 160 of U.S. Pat. No. 8,367,960.

However, being able to fill the entire cross-sectional area 12B in FIG. 4 of U.S. Pat. No. 8,367,960 with a single layer in the radial direction without having to apply multiple radial layers, and being able to omit any post-heating from the process, presents a nontrivial engineering problem, requiring a non-obvious, inventive solution. This is because consumable fill materials used in welding—when they are hot and still in liquid form just after being applied—will not pool with enough depth to fill a wear pocket along, say, the radius 1 in FIG. 5, which wear pocket (cross section in need of filling) may be a half inch or more above the worn surface of the rail.

Rather, if an attempt is made to fill such a large pocket all in one pass, gravity will spread out and thin the weld pool while drawing the liquefied fill down toward the ground, defeating such an attempt. Thus, fill material applied along the radius 1 in FIG. 5 of U.S. Pat. No. 8,367,960 over the entire region to be filled beyond the worn rail surface would flow down the left side of the illustrated rail and not fill the entire cross-sectional area as desired. This flow problem is why U.S. Pat. No. 8,367,960 notes at column 6 lines 8-10 that the layers are about 0.15 inches apiece: at this reduced depth, the adhesion, surface tension and viscosity of the consumable fill material employed will presumably counteract this flow problem. But this thin layering means multiple radial layers are needed to complete the entire fill. This becomes the source of the radial layering problems discussed above, and is the reason why the post-heating step is needed in U.S. Pat. No. 8,367,960.

It would be desirable in view of the above to have a method and related systems and apparatus components, which enable rail refurbishments to occur in much less time and at substantially lower costs with much less disruption, than do the methods available at present.

And in particular, it would be desirable to make nonobvious improvements to the basic weld process of U.S. Pat. No. 8,367,960, which improvements would enable a single radial layer of fill material to be applied in a single pass to minimize repair time without any post-heating. This would maximize the strength, durability and lifecycle of the railway refurbishment, eliminate susceptibility to cracking and chipping form heavy rail traffic, and allow the refurbishment process to be competed in the shortest time and at the least expense possible.

SUMMARY OF THE INVENTION

A method and related system and apparatus for refurbishing worn rail transit rails to a desired refurbished rail surface profile substantially similar to the surface profile of a newly-manufactured rail, comprising, for a rail in need of refurbishment between a lower-inside section thereof to be refurbished and an upper-outside section thereof to be refurbished, expanding a surface profile of the rail in need of refurbishment to a filled rail surface profile beyond a surface profile of the desired refurbished rail, by: depositing a first line of fill material along the lower-inside section to be refurbished; in N−1 successive iterations thereafter, progressing circumferentially from the lower-inside section to be refurbished to the upper-outside section to be refurbished, depositing an $n+1^{th}$ line of fill material adjacent an $n^{th}$ line of fill material wherein the $n^{th}$ line of fill material substantially provides a flow barrier against the $n+1^{th}$ line of fill material flowing past the $n^{th}$ line of fill material; wherein: n=1, 2, 3 . . . N is an integer designating an iteration number, and where N≥2 is an integer designating a total number of lines of fill material deposited and a total number of iterations.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 7 illustrates frontal and side plan views projected into one another, for each of a set of four rail-finishing milling cutters used in accordance with the invention. The illustration of four such rail-finishing milling cutters, rather than some other number of cutters, is illustrative and not limiting.

FIG. 8 illustrates a side cross-sectional view of the filled rail of FIG. 6 being finished by the rail-finishing milling cutters of FIG. 7.

FIG. 15 is a top-town schematic aerial view illustrating two parallel sections of railroad rail, traversed by a refurbishment vehicle comprising two of the rail preparation assemblies of FIG. 13, two sets of the fill-welding system arrays reviewed in FIG. 5, and two of the rail finishing assemblies of FIG. 14, in a simultaneous-milling preferred embodiment of the invention.

FIG. 16 illustrates a top-town schematic aerial view similar in all respects to FIG. 15, but for a serial-milling alternative preferred embodiment of the invention.

FIGS. 17A through 17J illustrate side cross-sectional views of the surface profile of the prepared rail, as it is circumferentially fill-welded from the lower inside to the upper outside of the rail.

DETAILED DESCRIPTION

Figure 1:
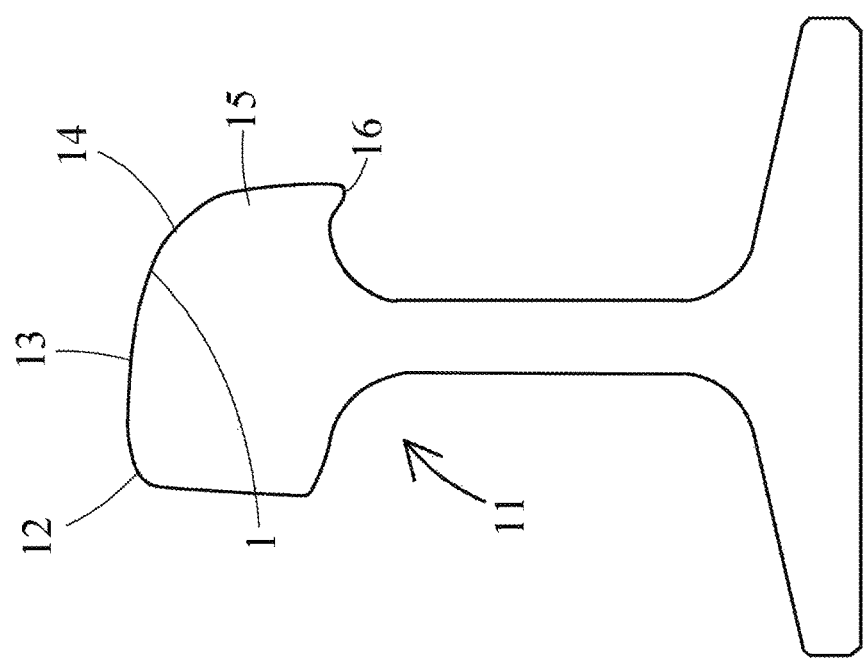
FIG. 1 illustrates a side cross-sectional view of a worn railroad rail in need of repair, to be repaired in accordance with the teachings of this disclosure.
Figure 9:
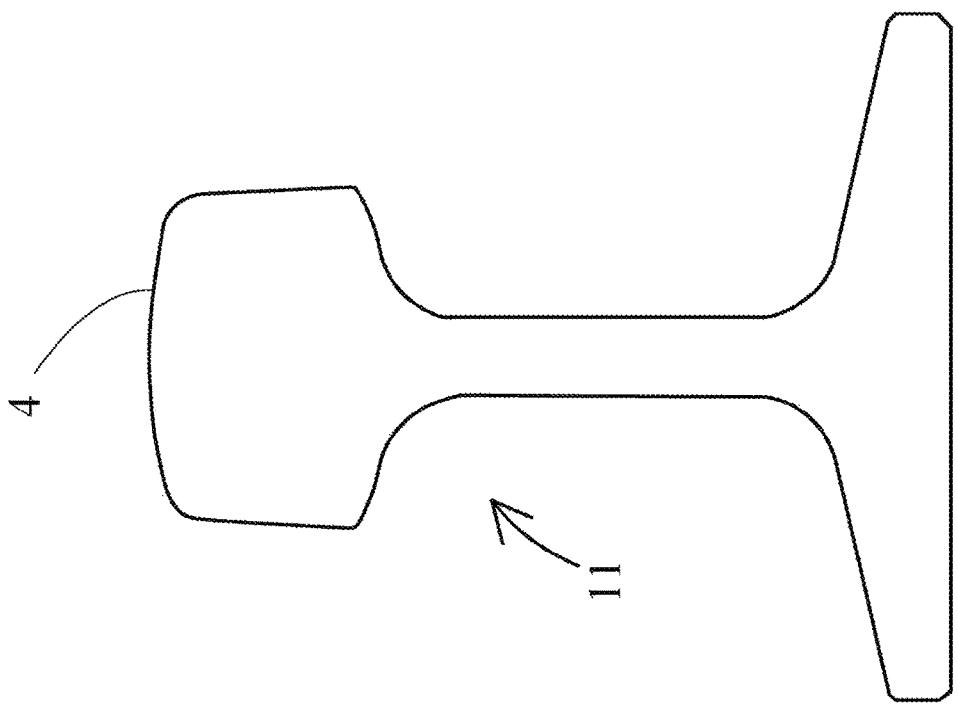
FIG. 9 illustrates a side cross-sectional view of the filled rail of FIG. 6, after it has been operated upon by the rail-finishing milling cutters of FIG. 7 as in FIG. 8. This will be referred to as the refurbished rail. In accordance with preferred best practice for this invention, the surface profile of this refurbished rail is substantially the same as the surface profile for a newly-manufactured rail.

FIG. 1 illustrates a side cross-sectional view of a worn railroad rail 11 in need of repair, to be repaired in accordance with the method and related system and apparatuses of this invention which will now be disclosed in detail. For comparison, the reader is also referred to FIG. 9 which is a side cross-sectional view of this same rail 11 after it has been refurbished in accordance with this invention. So the objective of the invention is to start with the worn railroad rail 11 with the side cross-sectional profile 1 of FIG. 1 and end up with the refurbished rail 11 with the refurbished cross-sectional profile 4 of FIG. 9, which surface profile 4 is substantially the same as the surface profile for a newly-manufactured rail. For further comparison, the reader is also referred to FIG. 10 which shows the progression of surface profiles from the worn rail surface profile 1 of FIG. 1, to the prepared rail surface profile 2 of FIG. 4, to the filled rail surface profile 3 of FIGS. 5 and 6, to the refurbished rail surface profile 4 of FIG. 9.

Figure 10:
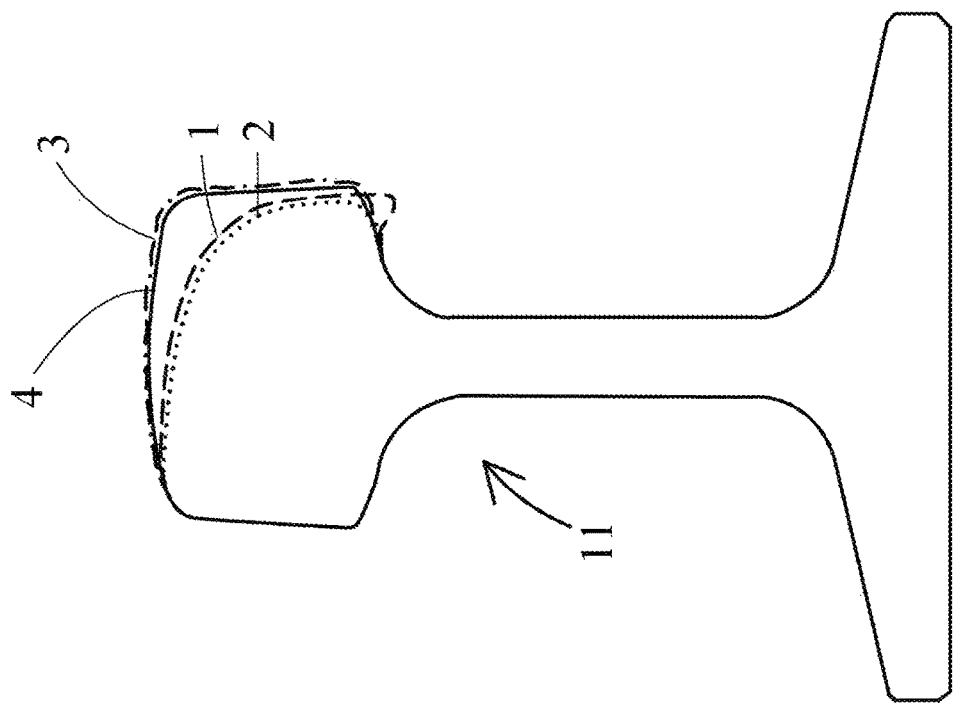
FIG. 10 illustrates a side cross-sectional view of the surface profiles of all of: the worn railroad rail of FIG. 1; the prepared rail of FIG. 4; the filled rail of FIGS. 5 and 6; and the refurbished rail of FIG. 10. This figure thereby summarizes the process carried out in FIGS. 1 through 9, by juxtaposing these surface profiles of the rail at various states of repair to enable easy comparison by the reader.

Comparing FIG. 1 to FIG. 9, see also FIG. 10, it will be seen that the worn rail surface profile 1 is quite different from the refurbished rail surface profile 4. This is because an originally-manufactured rail 11 has a surface profile substantially the same as that of refurbished rail surface profile 4, over time the passage of trains causes the rail 11 to deform in certain ways that we shall now review:

The left hand side of FIG. 1 illustrates the outer region of the rail 11 away from where the train wheels make contact with the rail 11. The right hand side of FIG. 1 represents the inner region of the rail 11 where the train wheels make do contact with the rail 11. For a trail travelling "into the page" this would be the left-side one of two parallel rails 11. The outer upper rail region 12 where the wheels do not make contact remains relatively undisturbed, while as a result of the great tonnage of many trains which travel the rails over time, the middle upper rail region 13 and especially the inner upper rail region 14 are deformed into a lower disposition. Likewise, the inner region 15 is deformed outwardly, and the inner lower rail region 16 develops a definitive sag as illustrated. Again, this wear is especially apparent if one compares FIGS. 1, 9 and 10. It should especially be noticed from FIG. 10 that the greatest degree of deformation occurs toward the upper right of the rail as shown, with lesser deformation proceeding circumferentially about the railhead from there toward both the upper left and toward the lower right. Again, this wear pattern develops because the upper right region in FIG. 10 is the region subjected to the greatest contact force by the train wheels. The refurbishment method to now be disclosed takes specific advantage of this unique rail 11 wear pattern.

Figure 2:
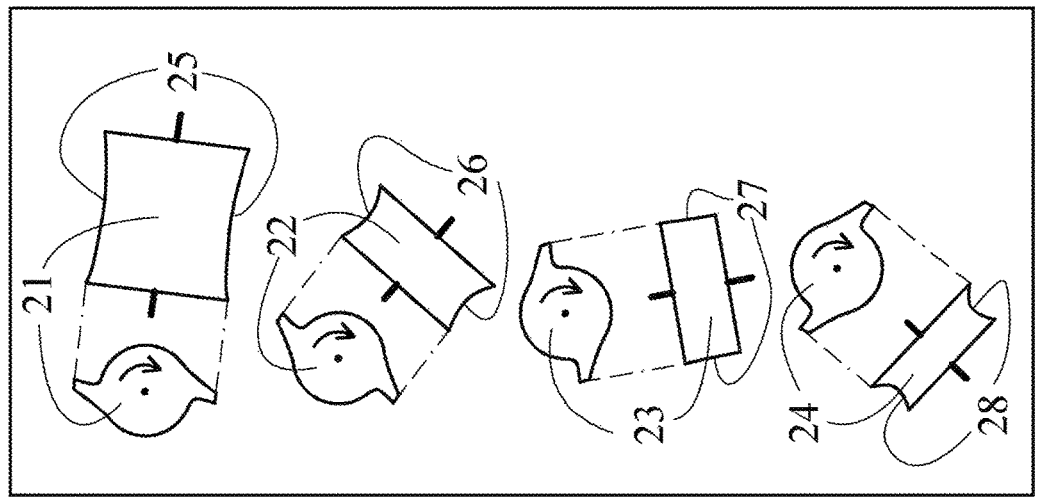
FIG. 2 illustrates frontal and side plan views projected into one another, for each of a set of four rail-preparation milling cutters used in accordance with the invention. The illustration of four such rail-preparation milling cutters, rather than some other number of cutters, is illustrative and not limiting.
Figure 3:
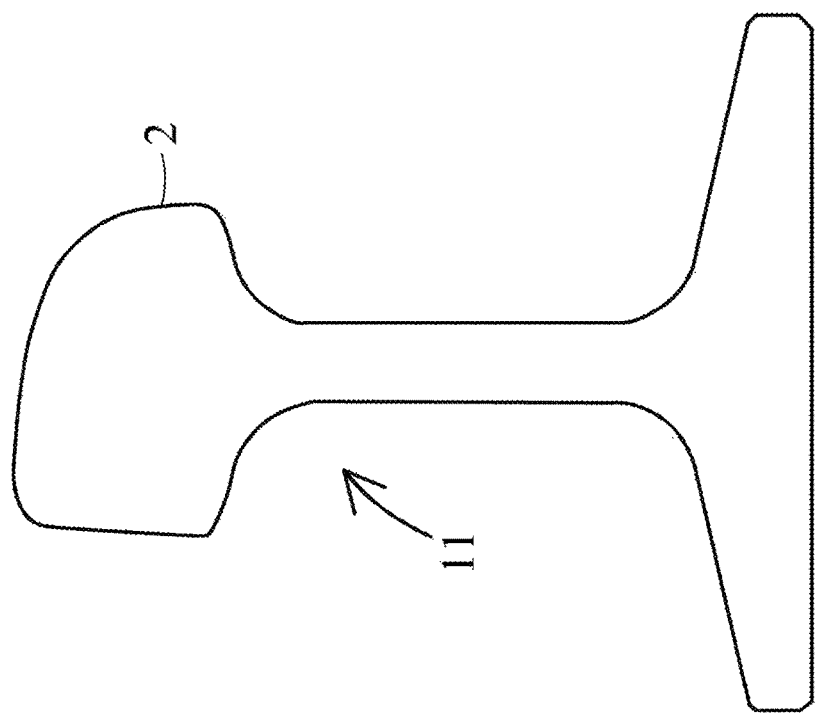
FIG. 3 illustrates a side cross-sectional view of the worn railroad rail of FIG. 1, being operated upon by the rail-preparation milling cutters of FIG. 2.
Figure 4:
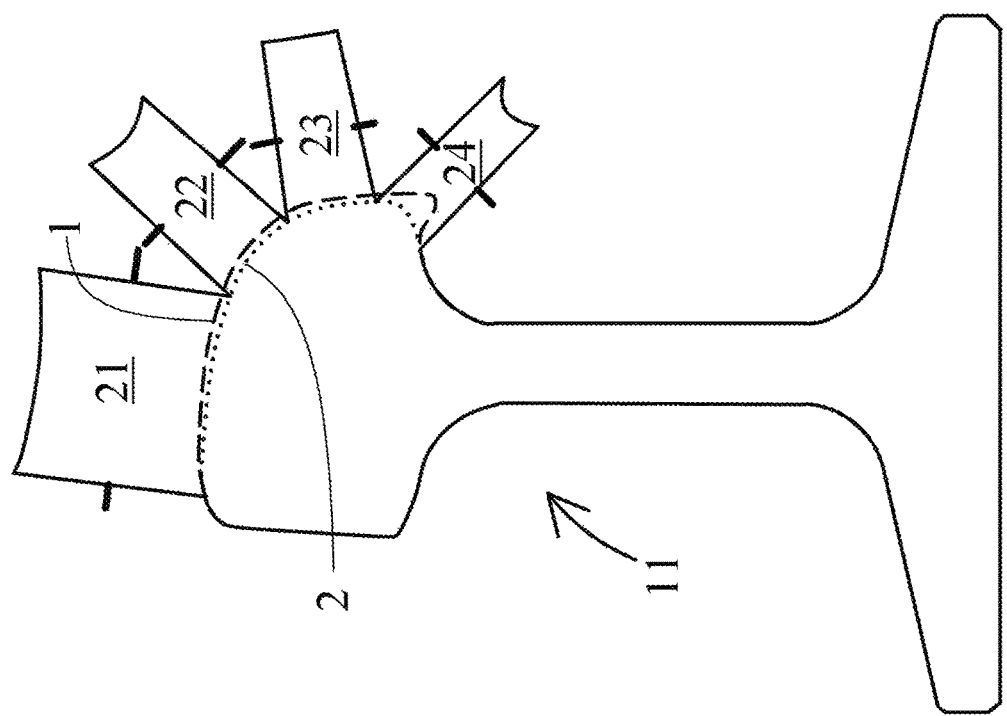
FIG. 4 illustrates a side cross-sectional view of the worn railroad rail of FIG. 1, after it has been operated upon by the rail-preparation milling cutters of FIG. 2 as in FIG. 3. This will be referred to as the prepared rail.

To refurbish the rail 11 against this wear, the first (optional) step is to use a set of rail-preparation milling cutters 21, 22, 23, 24 shown in FIG. 2 to mill the worn rail surface profile 1 down to prepared rail surface profile 2 shown in FIG. 4, via the configuration and method illustrated in FIG. 3. While four such cutters are depicted, this number is illustrative, not limiting. As illustrated in FIG. 2 and as is standard in the art, each cutter rotates in the direction shown by the unnumbered arrows about the unnumbered rotation axles, and cuts the workpiece (the rail 11) by performing milling operations in the manner that is well-known in the art, see, for example, https://en.wikipedia.org/wiki/Milling_(machining) and https://en.wikipedia.org/wiki/Milling_cutter. However, as we shall now discuss, these rail-preparation milling cutters 21, 22, 23, 24 are all specially configured and arrayed to facilitate the rail refurbishment method at hand.

Specifically, each of the rail-preparation milling cutters 21, 22, 23, 24 is specially configured to comprise respective concave cutting surfaces 25, 26, 27, 28 which can be seen from the orthogonal projections also depicted in FIG. 2. Additionally, these concave cutting surfaces 25, 26, 27, 28, when arrayed together as shown in FIG. 3, combine to form an overall profile which matches the prepared rail surface profile 2 of FIG. 4 to be milled by these rail-preparation milling cutters 21, 22, 23, 24. So as will be readily appreciated, when the array of rail-preparation milling cutters 21, 22, 23, 24 with concave cutting surfaces 25, 26, 27, 28 are rotating to perform milling cutting, and when this array is also moved linearly along the rail (i.e., on an axis perpendicular to the page of FIG. 3), these rail-preparation milling cutters 21, 22, 23, 24 will cut slightly below the worn rail surface profile 1, to create the prepared rail surface profile 2. The result of this operation is illustrated by the prepared rail surface profile 2 in FIG. 4.

Comparing the worn rail surface profile 1 with the prepared rail surface profile 2 (see FIG. 10 for the most direct comparison), it will be seen that a small amount of rail material has been removed from the rail 11 via the operation of the rail-preparation milling cutters 21, 22, 23, 24. In addition, the particular rail-preparation milling cutter 24 has milled out the sag from the inner lower rail region 16. As a result, the rail material which is exposed following the FIG. 3 preparation-milling operation is fresh un-weathered material, as opposed to the possibly-weathered material which has been milled away.

Figure 5:
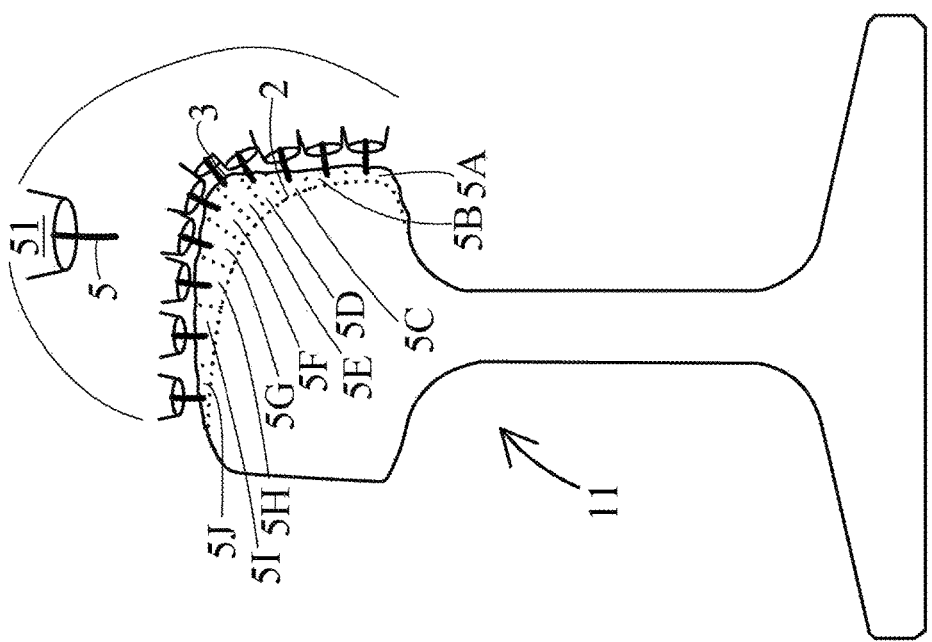
FIG. 5 illustrates a side cross-sectional view of the prepared rail of FIG. 4, with rail fill material being deposited thereon by the circumferential-progression fill-welding process of this disclosure, explicitly delineating the region over which the rail fill material has been added and the circumferential progression of this process. This will be referred to as the filled rail. Also illustrated in schematic form is an array of fill-welding systems depositing fill material.

The preparation milling step which leads from FIG. 1 to FIG. 4 is an optional step, used in one of the preferred embodiments of the invention. The next step illustrated by FIG. 5 is to use a fill-welding process to deposit a fill material 5 over the prepared rail surface 2. So if the preparation milling step is used, the fill material 5 will bond to that newly-prepared rail surface 2. If omitted in an alternative preferred embodiment, then the fill material 5 will be bonded to the original worn rail surface 1. Particularly for rails that are in constant use, the reason this preparation milling step can be omitted in this alternative preferred embodiment, is because trains themselves "prepare" the rail 11 by their own weight, friction and vibration, so that the worn surface is not really weathered enough to mandate preparation-milling.

Proceeding now to FIG. 5, assuming the optional preparation milling step of FIGS. 1 to 4 has been used, the second step is to deposit a fill material 5 upon the prepared rail surface 2, using an array of fill-welding systems/processes 51 which will now be described in detail. If the step of FIGS. 1 through 4 is omitted, then the fill material 5 is deposited on the original worn rail surface 1. In either case, the deposition of fill material 5 via an array of fill-welding systems 51 raises/expands the surface profile of rail 11 to that of the filled rail surface profile 3, see FIG. 6. We shall assume for this non-limiting discussion that the optional preparation-milling step of FIGS. 1 to 4 has been used, so that we are raising the profile from 2 to 3 rather than from 1 to 3.

As noted in the background of the invention, U.S. Pat. No. 8,367,960 teaches applying multiple radial layers of metal illustrated by 20A through 20G of that patent, which is problematic because these radial layers are susceptible to subsequent chipping and cracking because of the multiple joints between adjacent layers. To remedy this, an extra, time-consuming post-heating step denoted by 160 of that patent is required. As illustrated by FIG. 5 here, and as will now be detailed, the present invention fills a single layer in the radial direction, by a progression of circumferentially-sequenced fill-welds.

At the top of FIG. 5, somewhat enlarged in relation to its smaller replication lower in this figure, we see a fill-welding system 51 schematically depositing a fill material 5 in accordance with the common practice by which the fill material 5 is (often) a consumable metal wire with a current passing therethrough, with the system 51 possibly applying other external sources of heat as well. Illustrated surrounding the top and right of the rail 11, is then an array comprising a plurality of such fill-welding systems 51 and fill materials 5 which are illustrated to be smaller in size and unnumbered. So the fill-welding system 51 with fill material 5 at the top of FIG. 5 is just a blowup of the individual systems in welding-system array.

The key to this method and the apparatus configuration which supports it, is to take advantage of the fact as earlier noted when discussing FIG. 1, that the greatest degree of deformation from wear occurs toward the upper right of the rail 11 as shown, with lesser deformation proceeding circumferentially about the railhead from there toward both the upper left and toward the lower right. More generally, for two rails in parallel, the greatest wear depth is toward the upper inside surface of each rail 11, with lesser wear depth toward the upper outside and lower inside rail 11 surfaces. So the first weld in the circumferential sequence of fill-welds is carried out using a fill-welding system 51 to deposit fill material 5 toward the lowest inside rail section to be refurbished, designated by the fill region 5A. Because the wear in the region 5A is relatively small, all that is needed is a thin layer of fill material 5. However, once the liquefied fill material 5 is applied in the region 5A and given a small amount of time (approximately a minute, give or take, dependent upon material, welding and ambient temperatures, etc.) to cool into a solidly-adhering state, this fill material 5 in region 5A will provide something of a "shelf" which can substantially block successively higher layers from flowing down.

So just after the fill material 5 in region 5A has cooled to just below its melting point and so has begun to solidify, a second fill-welding system 51 is used to successively deposit fill material 5 into region 5B atop the "shelf" of region 5A. The timing is important: the region 5A material should be sufficiently cooled to have just turned solid, yet still sufficiently hot so that contact by the hot fill material 5 in region 5B will re-melt the region 5A material at the interface between these two regions. In this way, after complete cooling down to ambient outdoor temperature, there will be no discernable joint (i.e., a substantially seamless joint) between regions 5B and 5A, and the juncture between the regions 5A and 5B will be properly tempered to ensure uniform hardness.

Next, a third fill-welding system 51 is used to successively deposit fill material 5 into region 5C atop the new "shelf" of region 5B in the exact same manner. Once again, the timing is important so that after complete cooling down to ambient outdoor temperature, there will be no discernable joint between regions 5C and 5B, which joint will become properly tempered to facilitate substantially-uniform hardness and substantial seamlessness. This filling process is repeated apace, iteratively progressing circumferentially about the railhead from the lower-inside to the upper-outside, through what are illustrated as regions 5D, 5E, 5F, 5G, 5H, 5I and 5J. At each step, the prior fill-weld provides a shelf for the next fill, and as the process progresses to the substantially-horizontal portion of the rail 11, the prior fill-weld provides a runoff barrier. Likewise, the careful timing of filling in relation to temperature at which the fill material 5 melts and solidifies ensures that the overall fill 5 in FIG. 6 has substantially-seamless joints and that the joinder regions are all properly tempered toward substantially uniform hardness.

FIGS. 17A through 17J illustrate this circumferential fill-welding from the lower-inside to the upper-outside cross sections of the rail 11 with each fill-weld providing a "shelf" (and for the horizontal parts of the rail 11 surface a runoff barrier) for the next successive fill-weld. Starting with FIG. 17A, we see the application of the initial fill material 5 into region 5A to establish the initial "shelf." Then, once the 5A region has dropped just below its melting point, fill material 5 is deposited into region 5B. This deposition will re-liquefy the 5A fill at the boundary between 5A and 5B, causing this boundary to be tempered into substantially-uniform hardness, so that 5A-5B is now a single, substantially-seamless, tempered region of substantially-uniform hardness. Now the top of region 5B provides the next "shelf."

By the time this process is iterated though FIGS. 17C and 17D and 17E and a substantially-seamless, tempered section 5A-5E has been deposited, the shelf has been built up enough so that the top surface of the rail 11 is substantially flat along a horizontal line. Now what we have called a "shelf" acts as a runoff barrier, and the remaining fill-welds simply progress from right to left (generally, from rail inside to rail outside) through FIGS. 17F through 17J. The end result at FIG. 17J is that the filled region 5A-5J is now equal to the entire filled region 5 illustrated in FIG. 6, and the cross-sectional surface has been built up to the filled rail surface profile 3 which is numerically referenced in FIG. 17J. So FIG. 17J is now equivalent in all respects to FIG. 6.

Several other aspects of the lower-inside-to-upper-outside circumferential filling process just disclosed with FIGS. 5 and 17 also warrant discussion. First while ten (10) successive fill-welds progressing circumferentially about the railhead from the lower-inside to the upper-outside of the rail 11 have been shown here, this is simply for illustration, without limitation. There may be more than ten, or less than ten such circumferential fill-welds employed for any given rail refurbishment project. The number of welds will depend on the particulars of the project being undertaken, including such factors as the degree of wear, how large a cross section of rail 11 needs to be refurbished, etc.

Second, related, it will be seen in FIG. 5 that for the regions such as 5A and 5J at the extremities which have sustained the thinnest wear, the angles traversed along the rail 11 circumference are larger than the angles traversed for the areas of deepest wear such as 5E and 5F. Because more fill material 5 needs to be deposited at the deep wear areas, the angles traversed by the deeper fills, in a preferred embodiment, will be smaller than the angles traversed by the shallower fills. In fact, as will be seen in FIG. 5, the extremal wear regions 5A and 5J have substantially-larger width than depth when taken locally-parallel to the circumference, while the central wear regions such as 5E and 5F conversely have substantially-larger depth than width locally-parallel to the circumference. The common thread is that, preferably, substantially the same cross sectional area of fill material 5 is deposited into each region. That is, the cross sectional areas of each of 5A through 5J are engineered to be substantially equal. One may think about this analogously to Kepler's gravitational law of planets sweeping out equal areas over equal times about the sun taken at the origin: here, when the surface to be deposited is closer to the radial origin of the railhead a circumferentially-shorter fill-weld 5 is deposited; and when the surface to be deposited is further from the railhead origin a circumferentially-longer fill-weld 5 is deposited.

In this way, if, for example, the 0.15 inch layering mentioned in U.S. Pat. No. 8,367,960 is optimal in view of the adhesion, surface tension and viscosity of the consumable fill material 5 which is applied, then the extremal regions 5A and 5J can be made about 0.15 inch in depth parallel to the circumference. Likewise, the fill 5 in the deep wear regions such as 5E and 5F may well be a half an inch or more in depth along to radii of the rail, yet still be only about 0.15 inch in length parallel to the rail 11 circumference. This is how only a single layer of fill material 5 needs to be deposited in the radial direction.

Third, by closely looking at each of FIG. 17 in succession, it will be seen that each fill-welding system 51 is situated to apply the consumable fill material 5 toward the top of its corresponding region 5A through 5J relative to gravitation, so that gravitation causes the fill material 5 to flow downward toward the "shelf" below. For the initial fill of FIG. 17A, the fill material 5 is applied upwards to where it is desired to have it end up, so that the first fill-weld and the first shelf is established by any downward flow induced by gravitation. Thereafter, we see a "high ground" fill 5 application in FIGS. 17B through 17D, via which any downward flow will be toward the shelf below. At this point, there is a roughly horizontal surface established atop the rail 11. Now, as fill is applied in 17E through 17J, the flow will naturally gravitate to the left, from the inner toward the upper outside surface of the rail 11, still from "high ground" to "low ground." With the final application in FIG. 17J, the fill material 5 will naturally flow from left to right (generally, inside to outside), completing the fill-weld process and establishing the entire filled rail surface profile 3 now explicitly numbered in FIG. 17J.

Fourth, in contrast to U.S. Pat. No. 8,367,960, because the successive layering is performed circumferentially not radially, there will be substantially no variation in hardness along the radii of the filled section 5 in FIG. 6. And because each successive circumferential region in FIG. 5 is filled while the previously-filled region is sufficiently solidified to act as a shelf yet still hot enough to re-liquefy at the boundary, this very process by which the layers are circumferentially deposited and timed in relation to melting/hardening temperature simultaneously provides the required tempering to ensure uniform hardness just like that of a newly-manufactured rail, and provide for substantial seamlessness between each circumferential section. As a result, the post-heating step 160 of U.S. Pat. No. 8,367,960 may be entirely omitted, yet the fill-weld 5 will be properly tempered and have substantially-uniform hardness and substantial-seamlessness, both radially and circumferentially.

Fifth, as earlier pointed out, the teaching in U.S. Pat. No. 8,367,960 of a repaired rail surface "exceeding the original rail surface hardness by, e.g., approximately 50%" is actually not a desirable outcome, because of an "eggshell/crush" effect wherein the inside becomes softer than the outside. Specifically, in addition to the wear profile we have focused upon to this point, the hardness of a newly-manufactured rail also diminishes over time due to repeated use and stressing. In other words, even material which has not worn off from the rail 11 will nonetheless have a reduced hardness because of the repeated compression then release forces applied to it by train traffic. This is analogous to jumping up and down repeatedly on firm cushion or spring, which will soften the cushion or spring over time.

Thus, although it is very desirable to refurbish to the same profile as a newly-manufactured rail, it is not preferred to refurbish a rail surface to the hardness of a new rail because of the "eggshell" effect, but only to the hardness of the use-softened rail. Therefore, although the original rail is fabricated primarily from carbon steel, it is desirable to make use of fill materials 5 which—after they are applied by using the method disclosed here—will have up to but not much more than substantially the same hardness as the originally-manufactured but use-softened carbon steel rail. The foregoing process, together with a suitable engineered choice of fill material, meets these objectives precisely.

In summary, for a rail in need of refurbishment between a lower-inside section thereof to be refurbished and an upper-outside section thereof to be refurbished, a surface profile of the rail in need of refurbishment is expanded to a filled rail surface profile beyond a surface profile of the desired refurbished rail, by first depositing a first line (e.g., bead) of fill material along the lower-inside section to be refurbished. In N−1 successive iterations thereafter, the fill-welding progresses circumferentially from the lower-inside section to be refurbished to said upper-outside section to be refurbished, where n=1, 2, 3 . . . N is an integer designating an iteration number, and where N≥2 is an integer designating a total number of lines of fill material deposited and a total number of iterations. So, iteratively, an $n+1^{th}$ line of fill material is deposited adjacent an $n^{th}$ line of fill material wherein the $n^{th}$ line of fill material substantially provides a flow barrier against the $n+1^{th}$ line of fill material flowing past the $n^{th}$ line of fill material. Further, the $n+1^{th}$ line of fill material is deposited at a time when the $n^{th}$ line of fill material has cooled sufficiently to substantially provide the flow barrier, but when the $n^{th}$ line of fill material also remains sufficiently hot wherein the $n^{th}$ line of fill material becomes sufficiently reheated by depositing the $n+1^{th}$ line of fill material proximate its juncture with the $n+1^{th}$ line of fill material to substantially seamlessly join the juncture between the $n^{th}$ and the $n+1^{th}$ lines of fill material. By virtue of the reheating the $n^{th}$ lines of fill material by the depositing of the $n^{th}$ lines of fill material, any subsequent post-heating of the N lines of fill material may be completely omitted.

Contrasting FIG. 6 to FIG. 9, see also FIG. 10, the fill material 5 has now been applied as a result of the foregoing method to expand the filled rail surface profile 3 beyond the refurbished rail surface profile 4. But it is the refurbished rail surface profile 4 which is the desired end result of the invention. The final step of the process now illustrated in FIGS. 7 and 8 is to conduct a second milling process which mills down the filled rail surface profile 3 into the refurbished rail surface profile 4. It will be observed that the filled rail surface profile 3 in FIG. 6 has been illustrated with a rough contour. This is because when the fill-welding process of FIGS. 5 and 17 is used to deposit fill material 5, the surface profile will not necessarily be smooth, but will reflect the randomness of depositing a material onto the prepared rail surface 2 without using a mold to shape the filled rail surface 3.

And so this brings us to the third and final step of the invention when the optional rail preparation step of FIG. 1 through 4 has been utilized. If the rail preparation step is omitted, then what we will now discuss is the second and final step.

FIG. 7 illustrates a set of four rail-finishing milling cutters 71, 72, 73, 74 used to now mill the filled rail surface 3 into the refurbished rail surface profile 4, which cutters are very similar to the rail-preparation milling cutters 21, 22, 23, 24. Each rotates in the direction shown by the unnumbered arrows about the unnumbered rotation axles, and each cuts the rail 11 in a manner well-known in the milling arts.

However, as was the case for FIG. 2, these are all specially configured and arrayed to facilitate the rail refurbishment method of the invention.

Once again, each of the rail-finishing milling cutters 71, 72, 73, 74 is specially configured to comprise respective concave cutting surfaces 75, 76, 77, 78 which can be seen from the orthogonal projections depicted in FIG. 7. In combination, these concave cutting surfaces 75, 76, 77, 78 are arrayed together as shown in FIG. 8 to form a combined profile which matches the desired refurbished rail surface profile 4. Consequently, when the array of rail-finishing milling cutters 71, 72, 73, 74 with concave cutting surfaces 75, 76, 77, 78 are rotating to perform milling cutting, and when this array is also moved linearly along the rail (i.e., perpendicularly to the page of FIG. 8), these rail-finishing milling cutters 71, 72, 73, 74 will cut slightly below the filled rail surface 3, thereby shaving off the excess fill material 5 which was earlier deposited during the fill-welding step of FIG. 5 which led to the result of FIG. 6. As a result, the rail 11 will now have the refurbished rail surface profile 4 illustrated in FIG. 9, which is the desired end result, because in the best practice of the invention, this refurbished rail surface profile 4 is substantially identical to the surface profile of a newly-manufactured rail.

Figure 6:
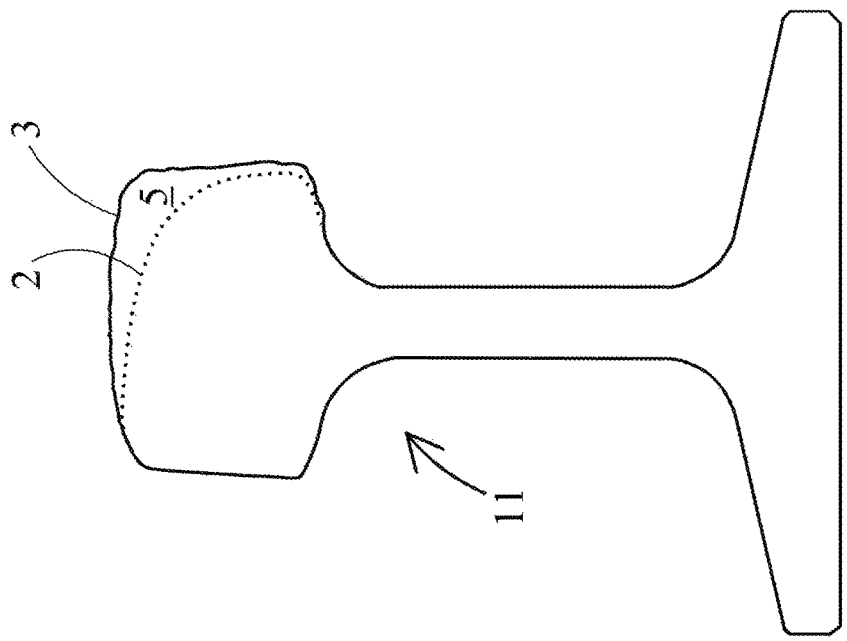
FIG. 6 illustrates a side cross-sectional view of the filled rail of FIG. 5, delineating the region over which the rail fill material has been added from the remainder of the rail, with the circumferential regions bonded after fill-welding and thus no longer delineated.

As stated earlier, FIG. 10 summarizes all of the above, by juxtaposing all of: the worn railroad rail surface profile 1 of FIG. 1; the prepared rail surface profile 2 of FIG. 4; the filled rail surface profile 3 of FIGS. 5 and 6; and the refurbished rail surface profile 4 of FIG. 10. The refurbished rail surface profile 4 which is the desired end product is illustrated with a solid line, while the other surface profiles are illustrated with a variety of broken lines. When all three steps are employed, the first step is to go from the worn railroad rail surface profile 1 to the prepared rail surface profile 2 using a first (preparation) milling process. The second step is to go from the prepared rail surface profile 2 to the filled rail surface profile 3 using a circumferential fill-welding process with deposits the fill material 5 as laid out with FIGS. 5 and 17. And the third and final step is to go from the filled rail surface profile 3 to the refurbished rail surface profile 4 using a second (finish) milling process. The two milling processes are identical processes; they simply utilize a different set of milling cutters which cut different surfaces. The first step entailing preparation milling to yield the prepared rail surface profile 2 is optional for rails in active use, because the friction of regular train traffic serves to already "prepare" the rail for fill-welding. The preparation milling step is thus more desirable for rails that are lightly-used and more weathered as a result.

Having summarized the fundamental elements of this method and the system and apparatus elements used to practice this process, it is now desirable to elaborate all of this with additional details.

First, in FIGS. 2 and 3, and in FIGS. 7 and 8, we illustrated the use of four (4) milling cutters, but also indicated that the illustration of four cutters, rather than some other number of cutters, is illustrative and not limiting. Working from FIGS. 6 and 8 (we could also work from FIGS. 1 and 3 because similar considerations apply), part of the underlying problem to be solved is that the cross-sectional surface profile of the part of a railroad rail 11 which contacts the train wheels is curved, not flat, and in particular, is convex. This means that any milling tools such as the rail-preparation milling cutters 21, 22, 23, 24 or the rail-finishing milling cutters 71, 72, 73, 74 which are used to prepare and finish this surface must have a correspondingly-concave profile. Simply put: to mill a convex cross section, one needs a matching/mated concave cutting surface for the milling cutter(s).

Figure 11:
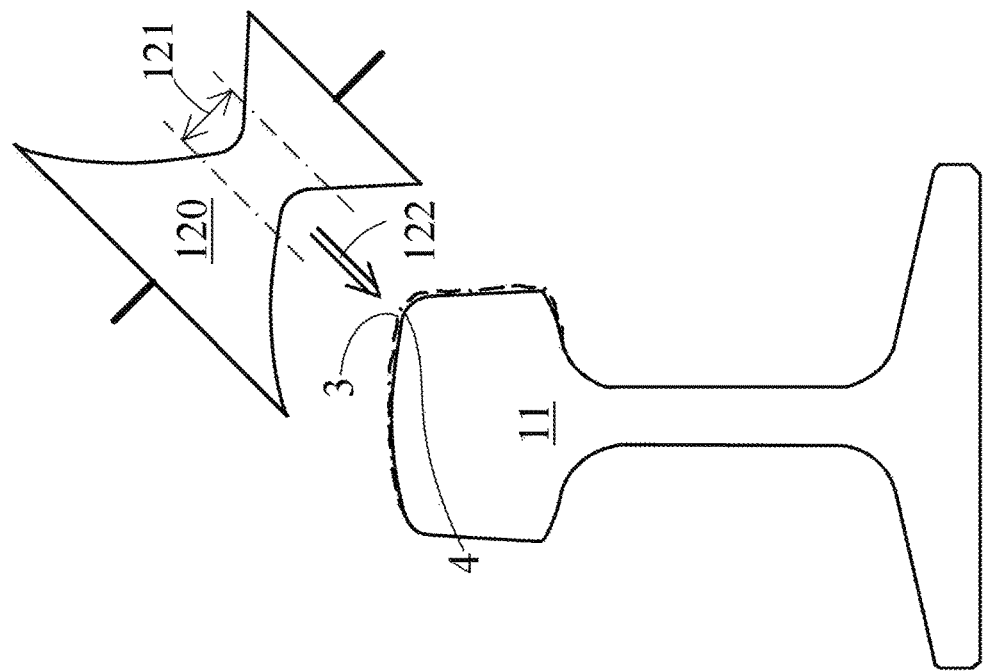
FIG. 11 is a schematic plan view illustrating how basic geometry renders it impossible for a single rigid milling cutter tool to mill more than 180 degrees of a concave surface cross section of rail.

Because milling cutting occurs via rotating a cutter about its axle as shown in FIGS. 2 and 7, each individual cutter can only cut up to 180 degrees of a concave surface cross section in principle, as will be appreciated by considering basic geometry. Specifically, as illustrated by FIG. 11, suppose we wanted to use a single hypothetical rigid milling cutter tool T to mill more than 180 degrees (>180°) of the operative surface of the rail 11, namely, the upper and inside surfaces of the rail which are contacted by train wheels and/or which have their profile deformed over time owing to contact by trail wheels. In order to conform to the convex rail surface over more than 180 degrees, the tool T itself would have to have a concave cutting surface which likewise exceeds 180 degrees, as illustrated by the excess surface denoted by cutting regions a, b, c, d in FIG. 11. Such a tool T, however, if it is a rigid tool, could not be physically fitted 111 over the surface of the rail 11 to perform the milling, and thus is a physical impossibility. In this situation, basic physical geometry dictates that at least two independent milling cutters are needed.

Figure 12:
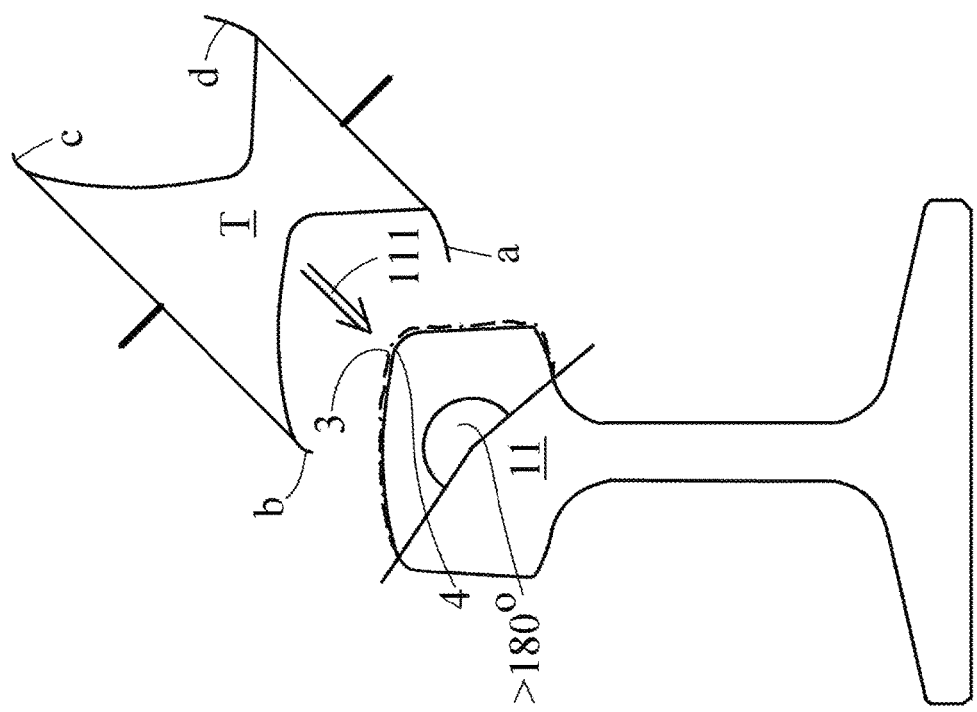
FIG. 12 is a schematic plan view illustrating a single milling cutter which can be used to mill a 180 degree cross section of rail, and is also used together with FIGS. 3, 8 and 11 to review the engineering tradeoffs which help optimize how many cutters should be employed for any given rail refurbishment project.

If we were to confine the milling surface to no more than 180 degrees, then it would be possible in theory to utilize a milling cutter such as the cutter 120 in FIG. 12 for this purpose, as this will fit 122 the desired rail surface profile. This is just the tool T of FIG. 11 with the regions a, b, c, d omitted, so that this tool 120 is a physical possibility for a rigid cutter. However, although this is now physically possible in theory, in practice milling is most effectively carried out when the orientation of the cutting surface of the milling cutter 120 is not too far from the orientation of the rotational axis (axle) of the milling tool. Preferably, for the most effective mill, the cutting angle and the axis angle should be within 30 to 45 degrees of one another. While this is the case for the central region 121 of the cutting surface of cutter 120 in FIG. 12, it is less the case for the extremal regions of the cutter 120. This is why a total of four (4) cutters were illustrated in FIGS. 2 and 3, and FIGS. 7 and 8.

It will be appreciated from the foregoing, that the design of the milling cutters is an engineering problem which balances a number of considerations in relation to the rails 11 for which their use is intended. For a refurbishment of lightly-worn rails, it may not be necessary to refurbish over a 180 degree+cross section of the rail, and so a smaller number of cutters may be needed. Or, it may not be deemed essential to remove the sag which is taken out specifically by the milling cutter 24 shown in FIG. 3, because this is not in operative contact with the train wheels. In this circumstance, the cutter 24 may be omitted from the process illustrated by FIG. 3. Likewise, other particulars of the refurbishment to be performed may motivate engineering decisions which affect the number of cutters and the concave cutting surface profiles of each cutter and where on the rail 11 these cutters are applied. All of these possibilities are well-understood, and regarded to be within the scope of this disclosure and its associated claims.

Let us now further examine the array of rail-preparation milling cutters 21, 22, 23, 24 shown in FIG. 3, and the similar array of rail-finishing milling cutters 71, 72, 73, 74 shown in FIG. 8. In a preferred embodiment, these are all assembled together into a rail preparation assembly 130 and a rail finishing assembly 140 schematically represented by the octagonal enclosures in FIGS. 13 and 14 respectively. All of the rail-preparation milling cutters 21, 22, 23, 24 are fixed and operably-connected to the rail preparation assembly 130 via the respective schematically illustrated driving connectors 131, 132, 133, 134. Likewise, all of the rail-finishing milling cutters 71, 72, 73, 74 are fixed and operably-connected to the rail finishing assembly 140 via the respective schematically illustrated driving connectors 141, 142, 143, 144.

These driving connectors 131, 132, 133, 134 and 141, 142, 143, 144 serve two primary functions. First, they cause each of the milling cutters 21, 22, 23, 24 and 71, 72, 73, 74 to be held fixed in arrays such that their cutting surfaces, taken in combination, define a surface cross section similar to that of the prepared rail surface profile 2 for the former array and the refurbished rail surface profile 4 for the latter array. This similarity (~) is denoted by ~2 and ~4 in FIGS. 13 and 14 respectively. Second, the driving connectors are responsible for driving the rotation of the milling cutters 21, 22, 23, 24 and 71, 72, 73, 74 so they can cut/mill the rail 11, using axles, gears, motors, etc., in ways which are well-known in the milling art.

It will now be appreciated that another one of the engineering considerations which determines how many milling cutters to use for preparation (FIG. 3) and for finishing (FIG. 8), is the need to preferably pack all of these cutters into a single rail preparation assembly 130 and into a single rail finishing assembly 140 via which the cutters in each assembly can all operate on the rail 11 simultaneously, in a preferred embodiment. Because each milling cutter requires its own driving connector to support its operation, the larger the number of milling cutters, the more packed the support hardware must be. So this mitigates toward using a smaller number of milling cutters when possible, balanced by engineering considerations against the desire to have each milling cutter cut the rail 11 with a profile not-too-angled in relation to the rail surface cross section being cut, as discussed earlier in relation to FIG. 12.

FIG. 15 is a top-town schematic aerial view illustrating two parallel sections of railroad rail 11 tied together by a series of railroad track ties 152 in a configuration orthogonal to the rails which will be familiar to anyone who has ever observed a railroad track. FIG. 15 further illustrates these sections of rail 11 being refurbished using simultaneous milling for rail preparation, and again, simultaneous milling for rail finishing. This is in contrast to serial milling for each of rail preparation and rail finishing illustrated by FIG. 16.

Schematically shown in FIG. 15, is a refurbishment vehicle 150, which ideally may be operated as a drone requiring minimal human support. Using such a refurbishment vehicle 150 is preferred for practicing the invention whether one uses the simultaneous milling embodiment of FIG. 15 or the serial milling embodiment of FIG. 16. This refurbishment vehicle 150 is preferably configured to travel by rail, including suitable means of locomotion power well-known in the art. Alternatively, the refurbishment vehicle 150 can be a truck with regular roadway wheels 11, but this is less preferred than travelling upon the rails 11. This is because there are calibration benefits to having the refurbishment vehicle 150 ride the rails 11, namely, that the contacts between wheels of the refurbishment vehicle 150 and the rails 11 establish a baseline point of contact for knowing the contour of the rails 11 and thus optimizing their refurbishment. If the rail rises or falls or undulates in its contour, these contour changes can be and are passed through to the positions of all of the refurbishment tools (e.g. milling cutters, fill-welding systems) which operate on the rails 11. In both the FIG. 15 and FIG. 16 embodiments, the refurbishment vehicle 150 travels forward 151 at a substantially constant rate of speed along the rails 11, as illustrated.

In this way, both of the parallel rails 11 are refurbished at the same time while the refurbishment vehicle 150 proceeds to travel 151 along the rails.

Figure 13:
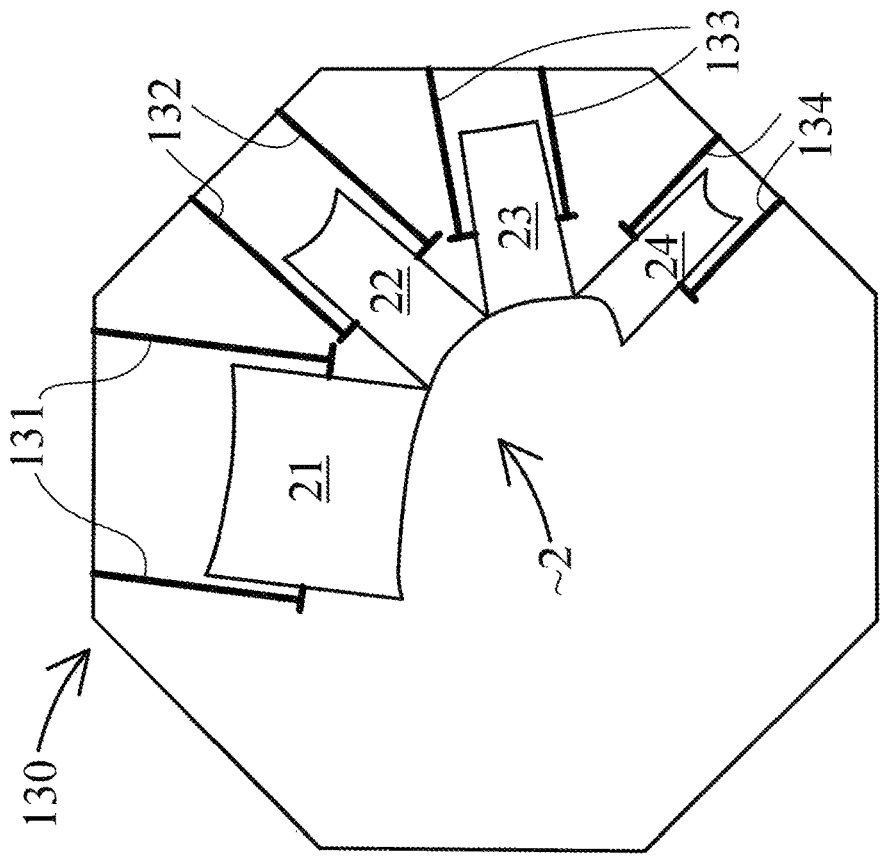
FIG. 13 is a schematic cross-sectional plan view illustrating a rail preparation assembly, comprising an array of the rail-preparation milling cutters of FIGS. 2 and 3.

In either FIG. 15 or FIG. 16, the first step is for the two rail preparation assemblies 130 pass over the rails 11. It will be understood that these two rail preparation assemblies 130 will have opposite parity/handedness to one another, because the assembly 130 travelling on the left rail 11 will need to operate primarily on the inside of the left rail 11 which of course is on the right side of the left rail 11, while the assembly 130 travelling of the right rail 11 will similarly need to operate primarily on the inside of the right rail 11 which is on the left side of the right rail. Referring to FIG. 13, it will be appreciated that all of the rail-preparation milling cutters 21, 22, 23, 24 contained within the two opposite-handed rail preparation assemblies 130 will simultaneously operate when configured as in FIG. 15 to mill any given cross section of the worn rail surface profiles 1 of the two rails 11 down to the prepared rail surface profiles 2.

Second, two fill-welding operations as elaborated in connection to FIGS. 5 and 17 deposit the fill material 5 on the two rails 11 to raise the two rails 11 up to the filled rail surface profiles 3 for each rail 11.

Figure 14:
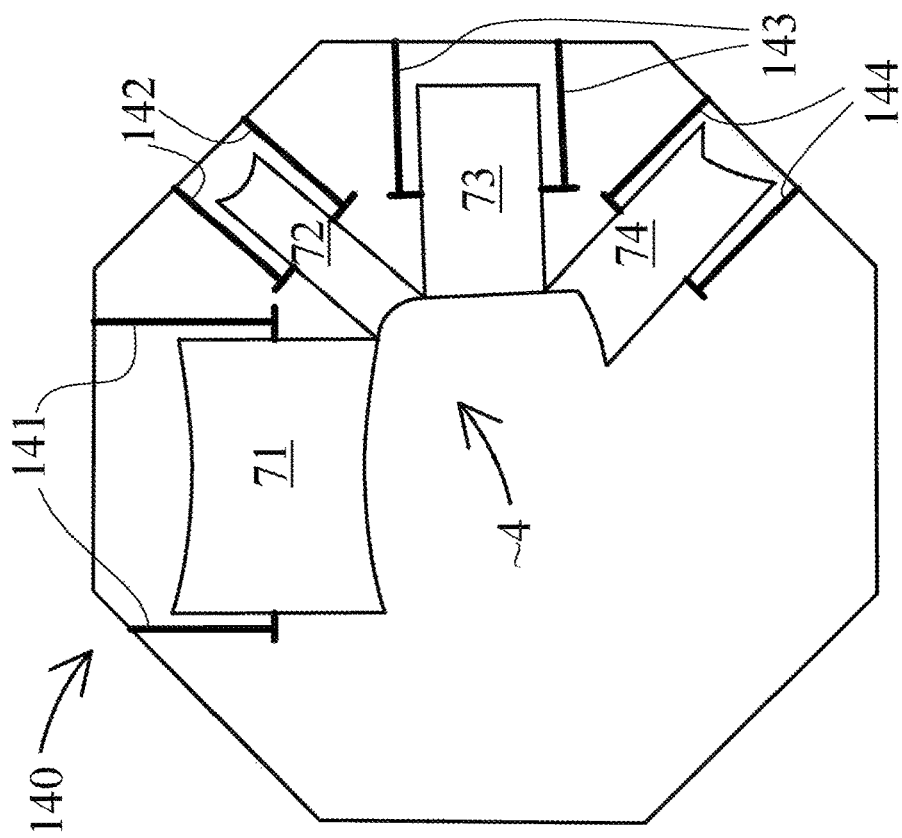
FIG. 14 is a schematic cross-sectional plan view illustrating a rail finishing assembly, comprising an array of the rail-preparation milling cutters of FIGS. 7 and 8.

Third and finally, the two rail finishing assemblies 140 pass over the two rails 11. Like the earlier assemblies 130, these two rail finishing assemblies 140 will be oppositely-handed, for the same reasons stated above. Referring to FIG. 14, it will be appreciated that all of the rail-finishing milling cutters 71, 72, 73, 74 contained within the two opposite-handed rail finishing assemblies 140 will simultaneously operate when configured as in FIG. 15 to mill any given cross section of the filled rail surface profiles 3 of the two rails 11 down to the refurbished rail surface profiles 4. Once the refurbishment vehicle 150 has moved forward from a section of the rails 11, those rails 11 will have been completely refurbished to a substantially "as new" condition, and these refurbished rails 11 will once again be ready for train traffic. No additional steps, such as the post-heating 160 of U.S. Pat. No. 8,367,960, are needed.

FIGS. 13 and 14, because they are taken from a view that sees a rail cross section, do not illustrate any relative depth as among the milling cutters 21, 22, 23, 24 and 71, 72, 73, 74. For the simultaneous milling embodiment of FIG. 15, there in fact is no relative depth, which is why the reference lines for these all terminate in positions perpendicular to the rails 11 i.e., parallel to the track ties 152. But for the serial milling embodiment of FIG. 16, the different milling cutters 21, 22, 23, 24 and 71, 72, 73, 74 do operate in serial fashion on any given cross section of the rails 11, rather than simultaneously, which is why their reference lines terminate more or less parallel to the rails 11, up to their lateral positioning to mill different parts of the rail cross sections. Other than that, the FIG. 16 serial method is the same as the FIG. 15 simultaneous method.

However, by having the milling cutters 21, 22, 23, 24 and 71, 72, 73, 74 all physically displaced from one another along the direction of travel on the rails 11 as in the serial embodiment of FIG. 16, it becomes possible for the milling cutters 21, 22, 23, 24 and 71, 72, 73, 74, if desired, to partially overlap with regard to the cross sections of the rail 11 upon which they operate. In other words, going back to FIGS. 13 and 14, if the milling cutters 21, 22, 23, 24 and 71, 72, 73, 74 as schematically illustrated in FIG. 16 are in fact staggered when viewed from above the railroad tracks, then these will not adjacently abut each other as in FIGS. 13 and 14. Consequently, their concave cutting surfaces 25, 26, 27, 28 and 75, 76, 77, 78 can partially overlap their cutting operations on the rail 11, which is an alternative embodiment of the invention using serial cutting rather than simultaneous cutting of the cross-sectional surface profile of the rails 11. It should be understood that for such a staggered, serial embodiment, the order in which the rail-preparation milling cutters 21, 22, 23, 24 are serialized, and the order in which the rail-finishing milling cutters 71, 72, 73, 74 are serialized, can be varied at will within the scope of this disclosure and its associated claims. Consequently, the serialization order of milling cutters in FIG. 16 is illustrative only, not limiting.

Figure 18:
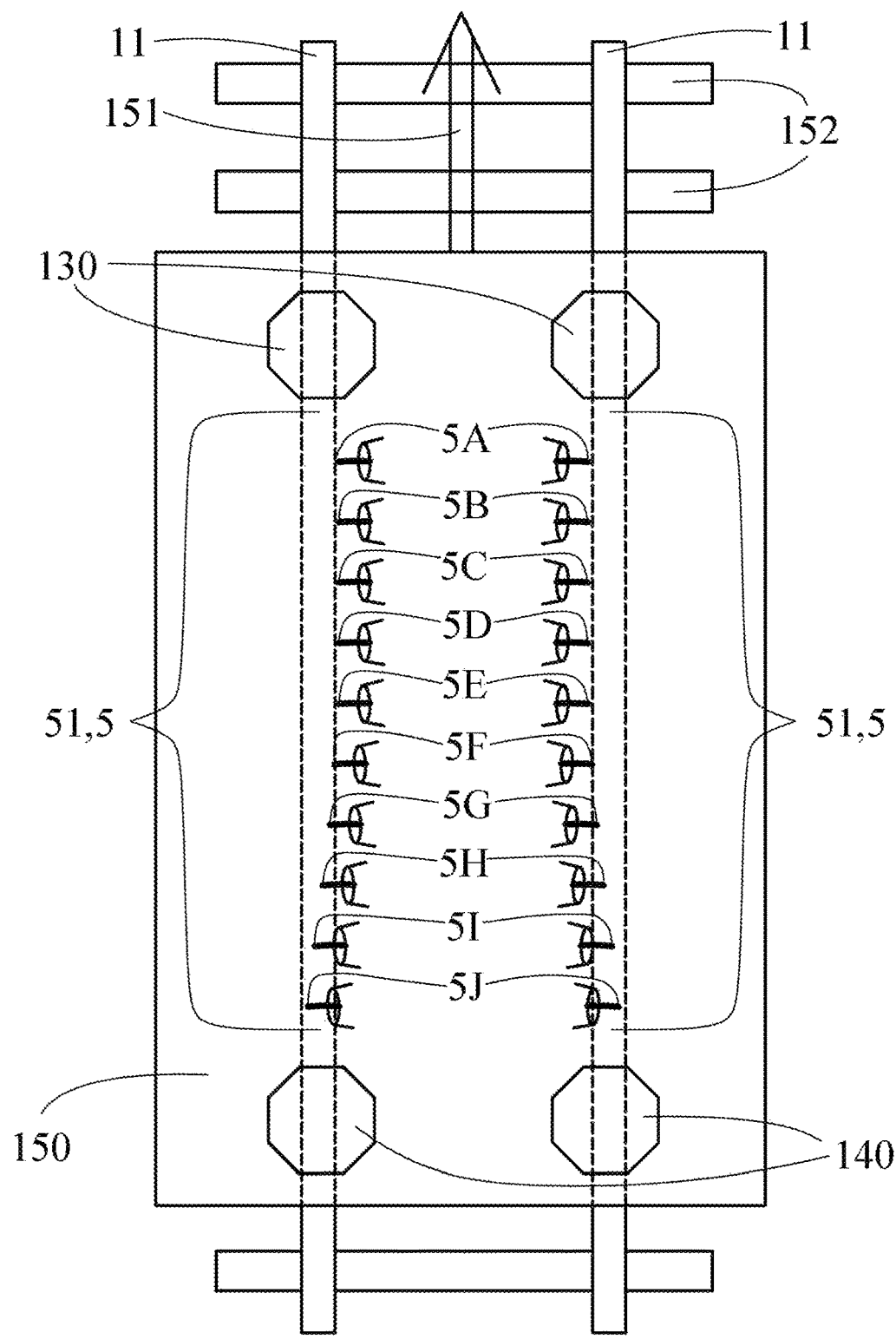
FIG. 18 illustrates a top-town schematic aerial view of the refurbishment vehicle of FIGS. 15 and/or 16, which further details the circumferential-progression fill-welding process of FIGS. 5 and 17.

While FIGS. 15 and 16 provided an aerial view of the refurbishment vehicle 150, schematically detailing the operational configuration of the rail preparation assembly 130 and the rail finishing assembly 140, FIG. 18 now compacts the assemblies 130 and 140, and instead illustrates the refurbishment vehicle 150 with expanded schematic details of the operational configuration of the fill-welding systems 51 used to deposit the fill material 5 on the rails 11.

As already described in reference to FIGS. 5 and 17, the temporal fill-welding progression about the railhead circumference is to apply the fill material 5 to the successive regions 5A through 5J for the non-limiting, illustrative example of ten (10) individual fill-welding systems 51. So in FIG. 18, we simply see a plurality of (e.g., ten) fill-welding systems 51 arrayed to successively deposit fill material 5 on the rails 11, circumferentially proceeding about the railhead from the lowest inside region 5A through the upper outermost region 5J when the refurbishment vehicle 150 travels in the direction indicated by 151. In the FIG. 18 schematic, the tips of the fill material 5 are illustrated to contact the rails 11 shown in hidden lines, in the same temporal succession from regions 5A through 5J as was already shown from the views of FIGS. 5 and 17 which are orthogonal to the view of FIG. 18, progressing up the inside rail 11 surfaces from 5A through 5E (which viewed from above would show minimal lateral inside-to-outside progression), then from inside top to outside top via 5F through 5J.

As was already discussed, it is important for the application of each successive fill-weld to be timed to occur just after the preceding fill-weld has cooled to just below its liquid-to-solid phase transition temperature. This is so that the former fill-weld acts as a shelf for the latter fill-weld, and so that latter fill-weld heats the common joint surface with the former fill-weld to heat and melt that surface of the former fill-weld back up above the solid-to-liquid phase transition temperature. This tempers the latter fill-weld with the former fill-weld and prevents the formation of mechanical joints/faults, yielding a substantially seamless joint. This in turn allows the post-heating step 160 of U.S. Pat. No. 8,367,960 to be entirely omitted while still yielding a substantially-uniform hardness both radially and circumferentially, without susceptibility to chipping and cracking. Once all the fill-welds are deposited and cooled, there is no need for any further heating. And this also reduces the time required for the overall rail refurbishment to be completed.

It should be apparent from all of the foregoing that the linear distance between each successive fill-welding system 51 in the overall refurbishment vehicle 150 array, together with the speed of transit 151, will determine how much time elapses between any given fill-weld and the circumferentially-subsequent fill-weld. In turn, the optimal elapsed time is determined by the temperatures of the liquid-to-solid and solid-to-liquid phase transitions (which physically may not necessarily be identical) of the fill material 5, the weld temperatures applied, the ambient environmental temperature, the rate at which heat is conducted/transferred by the fill material 5, and the melting/solidifying rapidity of the fill material 5. If these parameters need relative management and adjustment, the refurbishment vehicle 150 may also be equipped with additional devices to heat and/or cool the filled sections of the rail 11, suitably-disposed between one or more adjacent pairs of fill-welding systems 51, and/or in front of the first fill-welding system 51 and/or after the final fill-welding system 51. Also, the rails 11 filled 5 out to their filled rail surface profiles 3 should be cooled sufficiently to have solidified, before the rail finishing assemblies 140 mill the filled rail surface profiles 3 of the two rails 11 down to their final refurbished rail surface profiles 4.

Figure 19:
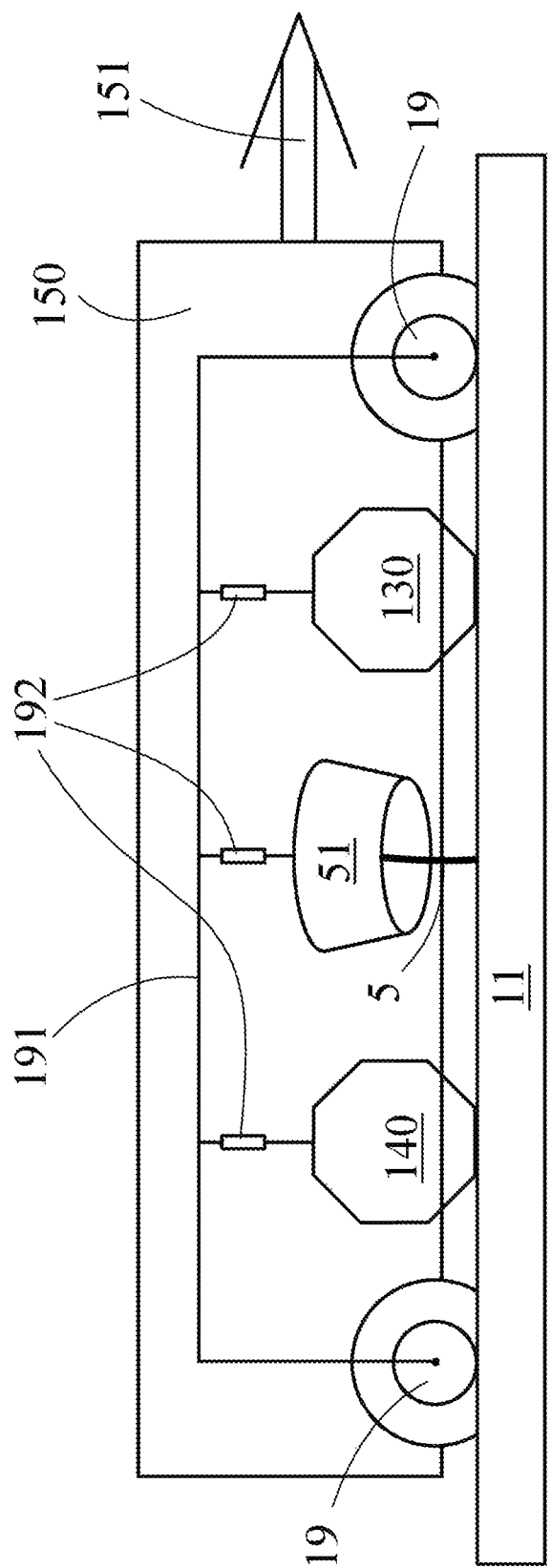
FIG. 19 is schematic plan view of the refurbishment vehicle previously shown in FIGS. 15, 16 and 18, but now viewed from the side of a section of track being refurbished. Particularly illustrated is how contacts between wheels of the refurbishment vehicle and the rails being refurbished can be used to precisely calibrate and fine tune the refurbishment process.

Earlier, it was pointed out that there are calibration benefits to having the refurbishment vehicle 150 ride the rails 11, namely, that the contacts between on-rail wheels 19 of the refurbishment vehicle 150 and the rails 11 establish a baseline point of contact for knowing and calibrating to the contour of the rails 11 and thus optimizing the rail 11 refurbishment. FIG. 19, taken from a side view of a section of track 11 being refurbished, schematically illustrates how contacts between on-rail wheels 19 of the refurbishment vehicle 150 and the rails 11 being refurbished can be used to precisely calibrate and fine tune the refurbishment process.

Specifically, a calibration interconnection 191 interconnects the on-rail wheels 19 with the rail preparation assemblies 130 (if used, see also FIGS. 15 and 16), with the plurality of fill-welding systems 51 (see FIGS. 5 and 18), and with the finishing assemblies 140 (see also FIGS. 15 and 16). This interconnection 191 may be physical, it may be informational responsive to position sensors in the data processing sense, or both. It will be readily appreciated from FIG. 19 that the contact of the refurbishment vehicle 150 on-rail wheels 19 against the rails 11 (only one of which rails 11 is visible from this side view) is the "input data" from which the contours of the track 11 become known. This data may be supplemented or even supplanted by e.g., laser or sonic sensors, not shown, and/or by several or multiple additional wheels, not shown, contacting the track at various locations but used to detect track contour and not to support the refurbishment vehicle 150, all of which may be used to acquire additional detailed input data about the tracks 11.

Responsive to this data sensed from the tracks 11, it can then be determined/deduced precisely where the rail preparation 130, fill-welding 5, 51 and/or rail finishing devices 140 should be optimally positioned for their respective operations. In this regard, FIG. 19 also schematically illustrates a fine tuning mechanism 192 which can be used to fine tune the operational positions of the rail preparation 130, fill-welding 5, 51 and/or rail finishing devices 140 to further optimize refurbishment performance. All of this may employ a computer/information system(s) comprising a user interface, a rail interface, computerized processing, wired or wireless computerized data transmission, and/or non-transient computerized storage to achieve this optimization.

It should be apparent referring especially to FIGS. 15, 16 and 18 which illustrate the preparation milling 130, fill-welding 51 and finish milling 140 steps all configured to occur in timed succession using a single refurbishment vehicle 150, that the overall process will only proceed as quickly as the slowest of these three steps can be carried out. In fact, the speed with which the refurbishment vehicle 150 travels 151 along the rails is synonymous the speed with which the rails are refurbished, because the entire process is carried out in a single pass. Because in practice milling is a relatively quick operation, it is welding which is the slower process, and so this is the part of the process that could pose a bottleneck to slow down the overall refurbishment if not expedited. This is one of the benefits of the single-pass welding process which does not require any form of post-heating in the manner of 160 in U.S. Pat. No. 8,367,960, which single-pass welding process may be implemented using a rail-travelling refurbishment vehicle 150 travelling 151 at a substantially-constant rate of speed. In essence the process disclosed here instead takes advantage of the circumferential filling progression shown in FIGS. 5, 17 and 18 to use the heat of the $n+1^{th}$ fill line to substantially seamlessly join the $n+1^{th}$ fill line and the previous $n^{th}$ fill line, which yields substantially-uniform hardness both radially and circumferentially throughout the entire fill-weld.

As to particular fill-weld processes, any fill-weld process which is known in the art or may become known in the future is suitable for practicing this invention, so long as it meets the functional objectives which have been elaborated in this disclosure. One process which appears very-well suited to the practice of this invention is so-called K-TIG (Keyhole Tungsten Inert Gas) welding. This is because as stated at http://www.k-tig.com/, "K-TIG welding is up to 100× faster than TIG/GTAW, reduces power and gas consumption by up to 95%, dramatically reduces labour costs and routinely delivers overall savings in excess of 90%."

While K-TIG appears to well-suited for the practice of this invention, this does not exclude the use of other processes such as GMAW (Gas Metal Arc Welding) employing a range of suitable shielding metals such as, but not limited to, widely-employed tungsten, so long as these processes meet the disclosed functional objectives in the manner disclosed here.

Because of the high speed and low cost at which this invention and can used to refurbish rails with less disruption than other known methods—especially those methods in which rail sections are replaced in their entirety—it is envisioned that the method disclosed here will become widely-used as part of routine rail maintenance programs throughout the world. Rather than waiting for rails to wear to the point that they must be replaced, or to depths of greater than about ½ inch which need to be filled, this process should optimally be employed on a regular basis prior to wearing of greater than ½ inch in the highest-wear rail 11 regions. However, because this invention allows each succession of fill material 5 to be laid in a thin surface as shown in FIG. 5, with a thin radial length at the least-worn extremal regions (e.g., 5A and 5J) and a thin circumferential length at the most-worn central wear regions (e.g., 5E and 5F), this method can be used to refurbish even deeply-worn rails.

In this regard, the configuration shown in FIG. 19 also has advantages that can be used to minimize the disruption of commercial rail traffic due to rail refurbishment when carried out in accordance with the teachings of this disclosure. For example, one might imagine a section of rail over which trains regularly travel, but for which there is a break in scheduled traffic for, say, e.g., six overnight hours on a given day. To refurbish the rail during that break time, it is necessary to place the refurbishment vehicle 150 onto the track at the start of the break time and remove it toward the end of the break time before regular commercial traffic resumes. For this purpose, as is not uncommon for railway maintenance vehicles, the refurbishment vehicle 150 may also be equipped with a set of off-rail, on-road wheels (not shown) which are lifted and descended at will, for example, mechanically, electronically, and/or hydraulically.

So when it comes time to start refurbishment, the on-road wheels are in a descended position which keep the on-rail wheels 19 raised above the level of the track 11. This enables the refurbishment vehicle 150 to drive up and position the on-rail wheels 19 over the tracks 11. Then, the on-road wheels are raised to descend the on-rail wheels 19 onto the tracks 11. At that point the refurbishment vehicle 150 can move 151 forward to refurbish the track 11 in the manner disclosed here. Finally, when it is time to vacate in favor of resuming commercial traffic, the on-road wheels are descended, which lifts the on-rail wheels 19 back to a raised position over the tracks 11 so that the refurbishment vehicle 150 can then drive off of the tracks and make way for regular rail traffic.

However, it will also be discerned that when the refurbishment is temporarily halted to make way for regular commercial rail traffic, that it would not be good to leave a discontinuity between the now-refurbished track 11 and still-to-be-refurbished track 11. For example, if a wear pocket of ½ inch (or perhaps even larger) is being repaired, it would be very undesirable and indeed dangerous to have a train suddenly hit a half inch rise or drop in the rails (depending on travel direction) right where the refurbishment last ceased.

This is where the fine tuning mechanism 192 has additional utility. Now, for example, the fine tuning mechanism 192 is used to very gradually alter the operational positions of the rail preparation 130, fill-welding 5, 51 and/or rail finishing devices 140 while the refurbishment vehicle 150 travels 151 over a final section of track 11 before departing in favor of regular rail traffic. These alterations are calculated and designed to create a very fine (temporary) downward grade over a short region of rail (on the order of tens of feet) from the now-refurbished track 11 to the still-to-be-refurbished track 11 which very fine grade becomes physically-indiscernible to the regular rail traffic.

Later, when refurbishment is resumed, the gradually-graded surface can similarly be filled out again using very fine alterations of the fine tuning mechanism 192. Alternatively—perhaps preferably to enable all refurbished track sections to have substantially-seamless joints—the very fine (temporary) downward grade over the short region of rail can be preparation-milled away, using the rail preparation 130 milling cutters of FIGS. 2 and 3, down to the newly-prepared surface profile 2 of FIG. 4. Then, filling proceeds in the manner already disclosed, starting with this newly-prepared surface profile 2 which is then raised to the filled rail surface profile 3 of FIGS. 5 and 6, then finally finish-milled to the refurbished rail surface profile 4 of FIG. 9.

Finally, even if the refurbishment method of this disclosure is not practiced by generally preparation milling 130 the worn rail surface 1 down to the newly-prepared surface profile 2 but rather is initiated by fill-welding 51 directly over worn rail surface 1, preparation milling 130 may still be employed simply for milling back any such (temporary) downward grades laid to interleave refurbishment operations with regular rail traffic, and/or may be employed in very limited regions where for other reasons preparation milling 130 is specifically warranted.

Although this disclosure has referred throughout to the refurbishment of railroad rails, it is to be understood that the teachings of this disclosure can be readily adapted to other transit rail systems as well, within the scope of this disclosure and its associated claims. This includes but is not limited to subway rails, monorails, and any other types of transit rails.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A method for refurbishing worn rail transit rails to a desired refurbished rail surface profile substantially similar to the surface profile of a newly-manufactured rail, comprising, for a rail in need of refurbishment between a lower-inside section thereof to be refurbished and an upper-outside section thereof to be refurbished, expanding a surface profile of said rail in need of refurbishment to a filled rail surface profile beyond a surface profile of the desired refurbished rail, by:
   depositing a first line of fill material along said lower-inside section to be refurbished;
   in N−1 successive iterations thereafter, progressing circumferentially from said lower-inside section to refurbished to said upper-outside section to be refurbished, depositing an $n+1^{th}$ line of fill material adjacent an $n^{th}$ line of fill material wherein said $n^{th}$ line of fill material substantially provides a flow barrier against said $n+1^{th}$ line of fill material flowing past said $n^{th}$ line of fill material; wherein
   during each of said N−1 successive iterations thereafter:
      depositing said $n+1^{th}$ line of fill material at a time when said $n^{th}$ line of fill material has cooled sufficiently to substantially provide said flow barrier, but when said $n^{th}$ line of fill material also remains sufficiently hot wherein said $n^{th}$ line of fill material becomes sufficiently reheated by depositing said $n+1^{th}$ line of fill material proximate its juncture with said $n+1^{th}$ line of fill material to substantially seamlessly joint said juncture between said $n^{th}$ and said $n+1^{th}$ lines of fill material,
   omitting any subsequent post-heating of said N lines of fill material, by virtue of said reheating said $n^{th}$ lines of fill material by the depositing of said $n^{th}$ line of fill material,
   said n=1, 2, 3 . . . N is an integer designating an iteration number, where N≥2 is an integer designating a total number of lines of fill material deposited and a total number of iterations.

2. The method of claim 1, further comprising applying a thin radial length of fill materials at the least-worn extremal regions of said rail and a thin circumferential length of fill materials at the most-worn central regions of said rail, by circumferentially separating adjacent ones of the N lines of fill material more widely in the extremal regions than in the central regions, and by depositing substantially similar cross sectional areas of fill materials into each of said lines of fill material.

3. The method of claim 1, further comprising, after expanding the surface profile of said rail in need of refurbishment to said filled rail surface profile:
   milling said filled rail surface profile down to said refurbished rail surface profile, using at least one rail-finishing milling cutter comprising a concave cutter profile conforming to a convex cross-sectional surface of said desired refurbished rail surface profile.

4. The method of claim 3, further comprising using a refurbishment vehicle comprising:
   N fill-welding systems for expanding said surface profile of said rail in need of refurbishment to said filled rail surface profile;
   said at least one rail-finishing milling cutter; wherein
   where said refurbishment vehicle travels in a forward direction along said rail in need of refurbishment, said surface profile of said rail in need of refurbishment is expanded to said filled rail surface profile before said milling said filled rail surface profile down to said refurbished rail surface profile.

5. The method of claim 4, said refurbishment vehicle further comprising:
   at least one rail-preparation milling cutter comprising a concave cutter profile conforming to a desired convex cross-sectional surface of said prepared rail surface profile of said rail in need of refurbishment; wherein:
   when said refurbishment vehicle travels in said forward direction along said rail in need of refurbishment, a worn rail surface profile of said rail in need of refurbishment is prepared by milling said worn rail surface profile down to a prepared rail surface profile using said least one rail-preparation milling cutter before said expanding the surface profile of said rail in need of refurbishment to said filled rail surface profile;
   said surface profile of said rail in need of refurbishment comprising said prepared rail surface profile.

6. The method of claim 3, said at least one rail-finishing milling cutter comprising a concave cutter profile conforming to a convex cross-sectional surface of said desired refurbished rail surface profile, comprising an array of at least two rail-finishing milling cutters each comprising a concave cutter profile conforming to a different portion of a convex cross-sectional surface of said desired refurbished rail surface profile.

7. The method of claim 6, further comprising simultaneously milling said different portions of said convex cross-sectional surface of said desired refurbished rail surface profile, suing said array of at least two rail-finishing milling cutters.

8. The method of claim 6, further comprising serially milling said different portions of said convex cross-sectional surface of said desired refurbished rail surface profile, using said array of at least two rail-finishing milling cutters.

9. The method of claim 3, said at least one rail-finishing milling cutter comprising an array of at least two rail-finishing milling cutters each comprising a concave cutter profile conforming to a different portion of a convex cross-sectional surface of said desired refurbished rail surface profile.

10. The method of claim 9, further comprising simultaneously milling said different portions of said convex cross-sectional surface of said desired refurbished rail surface profile, using said array of at least two rail-finishing milling cutters.

11. The method of claim 9, further comprising serially milling said different portions of said convex cross-sectional surface of said desired refurbished rail surface profile, using said array of at least two rail-finishing milling cutters.

12. The method of claim 1, said surface profile of said rail in need of refurbishment comprising the surface profile of the worn rail.

13. The method of claim 1, further comprising:
prior to expanding the surface profile of said rail in need of refurbishment to said filled rail surface profile, preparing a worn rail surface profile of said rail in need of refurbishment by milling said worn rail surface profile down to a prepared rail surface profile, using at least one rail-preparation milling cutter comprising a concave cutter profile conforming to a desired convex cross-sectional surface of said prepared rail surface profile of said rail in need of refurbishment;
said surface profile of said rail in need of refurbishment comprising said prepared rail surface profile.

14. A system for refurbishing worn rail transit rails to a desired refurbished rail surface profile substantially similar to the surface profile of a newly-manufactured rail, for a rail in need of refurbishment between a lower-inside section thereof to be refurbished and an upper-outside section thereof to be refurbished, comprising:
a fill-welding system for depositing a first line of fill material along said lower-inside section to be refurbished;
an array of N fill-welding systems for expanding a surface profile of said rail in need of refurbishment to a filled rail surface profile beyond a surface profile of the desired refurbished rail, configured to progress circumferentially in N−1 successive iterations thereafter, from said lower-inside section to refurbished to said upper-outside section to be refurbished, said array comprising:
said first fill-welding system;
an n+1$^{th}$ fill-welding system for depositing an n+1$^{th}$ line of first material adjacent an n$^{th}$ line of fill material wherein said fill material substantially provides a flow barrier against said n+1$^{th}$ line of fill material flowing past said n$^{th}$ line of fill material; wherein:
said n+1$^{th}$ fill-welding system configured relative to said n$^{th}$ fill-welding system for depositing said n+1$^{th}$ line of fill material at a time when said n$^{th}$ line of fill material has cooled sufficiently to substantially provided said flow barrier, but when said n$^{th}$ line of fill material also remains sufficiently hot wherein said n$^{th}$ line of fill material becomes sufficiently reheated by depositing said n+1$^{th}$ line of fill material proximate its juncture with said n+1$^{th}$ line of fill material to substantially seamlessly join said juncture between said n$^{th}$ and said n+1$^{th}$ line of fill material,
the system is further configured to omit any apparatus for subsequent post-heating of said N lines of fill material, by virtue of said configuration for reheating said n$^{th}$ lines of fill material by depositing said n+1$^{th}$ lines of fill material, and
said N≥2 is an integer designating a total number of said fill-welding systems and a total number of lines of fill material deposited and a total number of iterations, and said n=1, 2, 3 . . . N is an integer designating an iteration number and number said N fill-welding systems.

15. The system of claim 14, further comprising circumferentially separating adjacent ones of said N fill-welding systems more widely in the least-worn extremal regions of said rail than in the most-worn central regions of said rail, for applying a thin radial length of fill materials at the extremal regions and a thin circumferential length of fill materials at the central wear regions, by depositing substantially similar cross sectional areas of fill materials into each of said lines of fill material.

16. The system of claim 14, further comprising:
at least one rail-finishing milling cutter comprising a concave cutter profile conforming to a convex cross-sectional surface of said desired refurbished rail surface profile, for milling said filled rail surface profile down to said refurbished rail surface profile, wherein:
said array of fill-welding systems and said at least one rail-finishing milling cutter are configured in relation to one another wherein said surface profile of said rail in need of refurbishment is expanded to said filled rail surface profile before said at least one rail-finishing milling cutter mills said filled rail surface profile down to said refurbished rail surface profile.

17. The system of claim 16, said at least one rail-finishing milling cutter comprising a concave cutter profile conforming to a convex cross-sectional surface of said desired refurbished rail surface profile, further comprising an array of at least two rail-finishing milling cutters each comprising a concave cutter profile conforming to a different portion of a convex cross-sectional surface of said desired refurbished rail surface profile.

18. The system of claim 17, wherein said array of at least two rail-finishing milling cutters is configured to simultaneously mill said different portions of said convex cross-sectional surface of said desired refurbished rail surface profile.

19. The system of claim 17, wherein said array of at least two rail-finishing milling cutters is configured to serially mill said different portions of said convex cross-sectional surface of said desired refurbished rail surface profile.

20. The system of claim 16, said at least one rail-finishing milling cutter further comprising an array of at least two rail-finishing milling cutters each comprising a concave cutter profile conforming to a different portion of a convex cross-sectional surface of said desired refurbished rail surface profile.

21. The system of claim 20, said array of at least two rail-finishing milling cutters configured to simultaneously mill said different portions of said convex cross-sectional surface of said desired refurbished rail surface profile.

22. The system of claim 20, said array of at least two rail-finishing milling cutters configured to serially mill said different portions of said convex cross-sectional surface of said desired refurbished rail surface profile.

23. The system of claim 14, wherein said surface profile of said rail in need of refurbishment comprises the surface profile of the worn rail.

24. The system of claim 14, further comprising:
at least one rail-preparation milling cutter comprising a concave cutter profile conforming to a desired convex cross-sectional surface of said prepared rail surface profile of said rail in need of refurbishment, for milling a worn rail surface profile of said rail in need of refurbishment down to a prepared rail surface profile; wherein:
said at least one rail-preparation milling cutter and said array of fill-welding systems are configured in relation to one another wherein said at least one rail-preparation milling cutter mills said worn rail surface profile down to said prepared rail surface profile before said surface profile of said rail in need of refurbishment is expanded to said filled rail surface profile; and
said surface profile of said rail in need of refurbishment operated upon by said fill-welding, comprises said prepared rail surface profile.

25. The system of claim 16, further comprising a refurbishment vehicle comprising:
said N fill-welding systems for expanding said surface profile of said rail in need of refurbishment to said filled rail surface profile; and
said at least one rail-finishing milling cutter; configured wherein:
when said refurbishment vehicle travels in a forward direction along said rail in need of refurbishment, said surface profile of said rail in need of refurbishment is expanded to said filled rail surface profile before said at least one rail-finishing milling cutter mills said filled rail surface profile.

26. The system of claim 25, said refurbishment vehicle further comprising:
at least one rail-preparation milling cutter comprising a concave cutter profile conforming to a desired convex cross-sectional surface of said prepared rail surface profile of said rail in need of refurbishment, for milling said worn rail surface profile down to a prepared rail surface profile; configured wherein:
when said refurbishment vehicle travels in said forward direction along said rail in need of refurbishment, a worn rail surface profile of said rail in need of refurbishment is milled down to said prepared rail surface profile before said expanding the surface profile of said rail in need of refurbishment to said filled rail surface profile;
said surface profile of said rail in need of refurbishment comprising said prepared rail surface profile.

* * * * *